US012194958B2

(12) United States Patent
Yamamoto

(10) Patent No.: US 12,194,958 B2
(45) Date of Patent: Jan. 14, 2025

(54) VEHICLE-MOUNTED DEVICE

(71) Applicant: YOKOWO CO., LTD., Tokyo (JP)

(72) Inventor: Tsugio Yamamoto, Tokyo (JP)

(73) Assignee: YOKOWO CO., LTD., Tokyo (JP)

(*) Notice: Subject to any disclaimer, the term of this patent is extended or adjusted under 35 U.S.C. 154(b) by 306 days.

(21) Appl. No.: 17/613,501

(22) PCT Filed: Mar. 12, 2021

(86) PCT No.: PCT/JP2021/010094
§ 371 (c)(1),
(2) Date: Nov. 23, 2021

(87) PCT Pub. No.: WO2022/064740
PCT Pub. Date: Mar. 31, 2022

(65) Prior Publication Data
US 2022/0314932 A1 Oct. 6, 2022

(30) Foreign Application Priority Data
Sep. 24, 2020 (JP) ................. 2020-159678

(51) Int. Cl.
B60R 25/24 (2013.01)
(52) U.S. Cl.
CPC .................. B60R 25/24 (2013.01)

(58) Field of Classification Search
CPC ...... E05B 19/00; E05B 19/0005; E05B 47/00;
E05B 47/0012; B60R 25/00; B60R 25/24;
B60R 25/241; B60R 25/243; B60R
25/245; B60R 25/248
USPC .......................................................... 70/256
See application file for complete search history.

(56) References Cited

U.S. PATENT DOCUMENTS

2007/0273534 A1* 11/2007 McGinn ............. G07C 9/00174
340/572.8
2020/0299998 A1 9/2020 Testa et al.

FOREIGN PATENT DOCUMENTS

| DE | 102005059061 A1 * | 6/2007 | ......... B60R 25/2018 |
| DE | 102012015925 A1 * | 3/2014 | ......... E05B 19/0005 |
| JP | 2019-512630 A | 5/2019 | |
| JP | 2020-16065 A | 1/2020 | |
| JP | 6710832 B1 * | 6/2020 | |
| WO | WO-2017168341 A1 * | 10/2017 | ............. B60R 25/24 |

* cited by examiner

Primary Examiner — Nathan Cumar
(74) Attorney, Agent, or Firm — XSENSUS LLP

(57) ABSTRACT

A vehicle-mounted device (10) includes an accommodation unit (50) that accommodates an electronic key (7) of a vehicle (5), and a first actuator (31) and a second actuator (32) that each perform a button pressing operation on the electronic key (7) that is accommodated in the accommodation unit (50). The accommodation unit (50) allows the first actuator (31) and the second actuator (32) to each perform the button pressing operation on push buttons on different electronic keys (7) of different vehicles (5).

14 Claims, 15 Drawing Sheets

VEHICLE-MOUNTED DEVICE

CROSS-REFERENCE TO RELATED APPLICATIONS

The present application is based on PCT filing PCT/JP2021/010094, filed Mar. 12, 2021, which claims priority to JP 2020-159678, filed Sep. 24, 2020, the entire contents of each are incorporated herein by reference.

TECHNICAL FIELD

The present invention relates to a vehicle-mounted device that is mounted on a vehicle.

BACKGROUND ART

As a mode of using vehicles, there is a mode of sharing and using one or more vehicles by a plurality of persons. Car sharing and car rental correspond to such a mode. In the following, such a mode of use will be referred to collectively as "sharing".

In sharing, handling of a key for using a sharing target becomes an important issue. For example, Patent Literature 1 discloses a technology according to which a vehicle-mounted device where a circuit board taken out from a genuine electronic key is embedded is mounted in a vehicle in advance, and a user remotely unlocks/locks the door of the vehicle through control of the circuit board by the vehicle-mounted device. Specifically, when a user performs an operation of setting a vehicle to be used and a reservation date/time by accessing a management server with a user terminal (such as a smartphone), unique reservation information is stored in the user terminal. The vehicle-mounted device periodically communicatively connects to the management server, and acquires and stores reservation information for the vehicle where the subject device is mounted. The vehicle-mounted device communicates with the user terminal and acquires and checks the reservation information. In the case of valid reservation information, the vehicle-mounted device controls the circuit board taken out from the electronic key, and causes the circuit board to transmit a door unlock signal in radio waves and to transmit an authentication key data for starting the engine in radio waves.

PRIOR ART DOCUMENTS

Patent Literature

Patent Literature 1: JP-A-2020-16065

SUMMARY OF INVENTION

Problems to be Solved by the Invention

According to the technology of Patent Literature 1, sharing may be performed safely and reliably even when a person in charge is not present at all times as in a rental car office. However, it is burdensome because a task of disassembling the genuine electronic key and taking out the circuit board and a task of embedding the circuit board in the vehicle-mounted device are necessary.

As a mode of using car sharing, there is a mode of a promotion by which a user who is considering purchasing a new-model car is asked to test drive the new-model car. Design and convenience of a genuine electronic key are one way of conveying the appeal of the new-model car. However, according to the technology of Patent Literature 1, the electronic key is disassembled to take out the circuit board. Therefore, according to the technology of Patent Literature 1, the user cannot use the electronic key itself.

For example, an object of the invention is to provide a technology related to a vehicle-mounted device that is capable of eliminating burdensome tasks and that allows unlocking of a vehicle by using an electronic key as it is.

Solution to the Problems

A mode of the invention is a vehicle-mounted device including: an accommodation unit that accommodates an electronic key of a vehicle; and an actuator that performs a button pressing operation on the electronic key that is accommodated in the accommodation unit, where the accommodation unit allows the actuator to perform the button pressing operation on push buttons on different electronic keys of different vehicles.

According to this mode, the electronic key is used by being accommodated in the vehicle-mounted device as it is without being disassembled. The task of disassembling the electronic key, taking out an internal circuit and assembling the internal circuit with the vehicle-mounted device is not necessary.

DESCRIPTION OF EMBODIMENTS

A preferred embodiment will be described as an example, but the embodiment is not limited to the mode described below. Each drawing illustrates three orthogonal axes of a right-handed system. A forward/front side of the three orthogonal axes is an X-axis positive direction, a left side is a Y-axis positive direction, and an upward side is a Z-axis positive direction.

Figure 1:
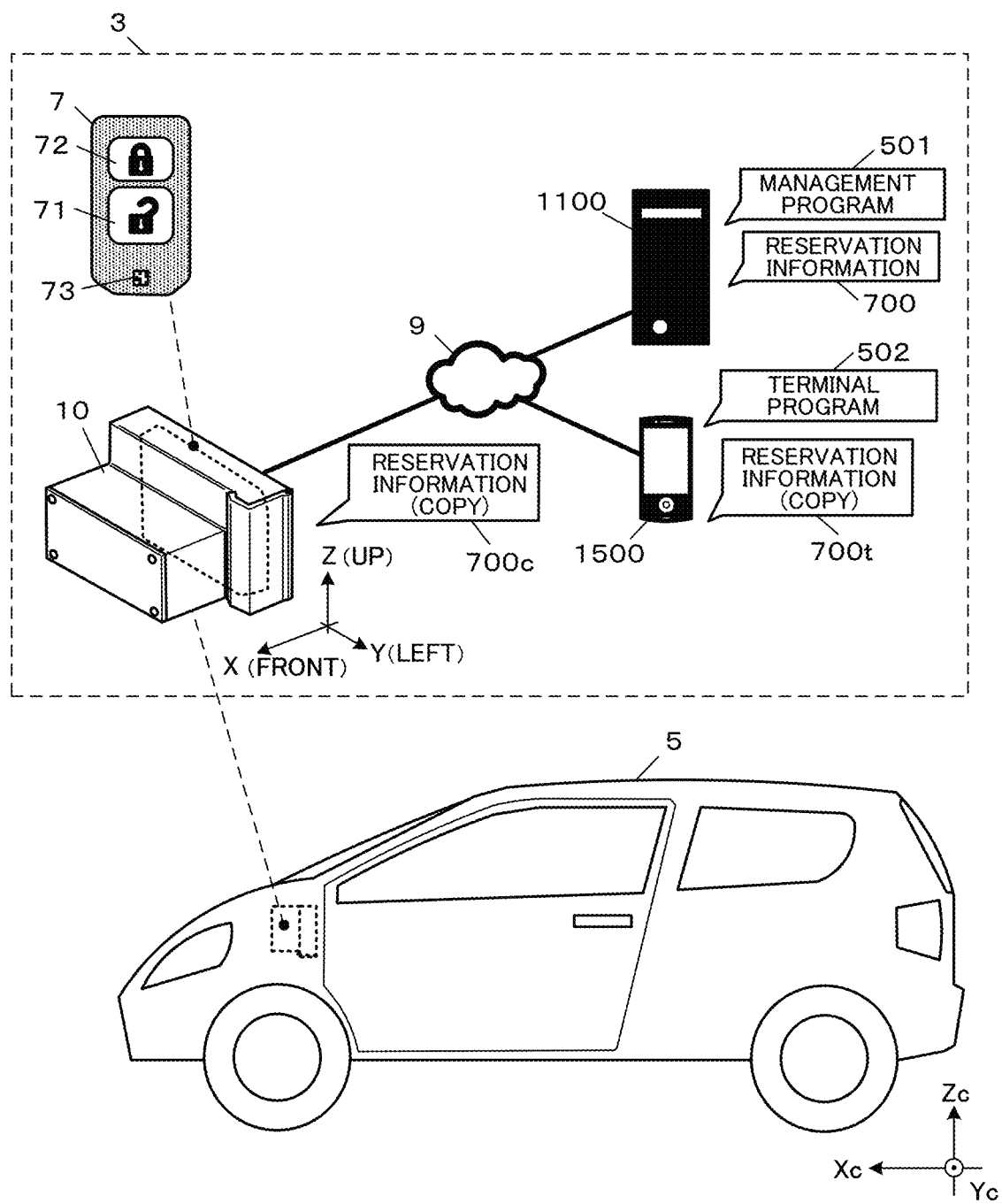
FIG. 1 is a diagram illustrating an example system configuration of a sharing system.

FIG. 1 is a diagram illustrating an example system configuration of a sharing system.

A sharing system 3 includes a vehicle 5 as a sharing target, a vehicle-mounted device 10, a server system 1100, and a user terminal 1500. The vehicle-mounted device 10 accommodates a genuine electronic key 7 that comes with the vehicle 5. The server system 1100 communicatively connects to the vehicle-mounted device 10 over a network 9. The user terminal 1500 is a terminal that is used by a user of a sharing target and that communicatively connects to the vehicle-mounted device 10 over the network 9. One vehicle-mounted device 10 is mounted in the vehicle 5. In the actual operation of the sharing system 3, one or more sets of the vehicle 5 and the vehicle-mounted device 10 are prepared, and a plurality of user terminals 1500 are used.

The electronic key 7 includes an unlock button 71 and a lock button 72. The unlock button 71 and the lock button 72 are push buttons for unlocking/locking a lock mechanism of the vehicle 5 as the sharing target. When the unlock button 71 is pressed, the electronic key 7 transmits a predetermined unlock signal in radio waves, and when the lock button 72 is pressed, the electronic key 7 transmits a predetermined lock signal in radio waves. The electronic key 7 may be configured with a physical key embedded therein or exposed therefrom. The electronic key 7 is a genuine original key that comes with the vehicle 5, but may alternatively be a key that is duly duplicated through a predetermined procedure specified by the vehicle manufacturer.

The network 9 refers to a communication channel that enables data communication. The network 9 refers to a dedicated line (a dedicated cable) for direct connection and a local area network (LAN) such as Ethernet (registered trademark), and moreover, to communication networks such as a telecommunication network, a cable network and the Internet, and communication may be performed in wired/wireless manners.

The server system 1100 performs user registration in the sharing system 3, reservation management, and provision of reservation information to the user terminal 1500 and the vehicle-mounted device 10. Specifically, the server system 1100 stores a management program 501 and executes the same to implement the following functions (1) to (5), namely, (1) a user registration function, (2) a function of setting reservation on a per vehicle 5 basis, (3) a function of creating reservation information 700 (including a unique reservation ID, a reserved vehicle ID, a reservation period, and a password, for example), (4) a function of providing a copy (reservation information 700t) of the reservation information 700 to the user terminal 1500, and (5) a function of providing a copy (reservation information 700c) of the reservation information 700 to the vehicle-mounted device 10.

The user terminal 1500 is a computer system that is used by the user and that is capable of connecting to the network 9, and may be implemented by a smartphone, a tablet computer, a laptop computer, a wearable computer or the like, for example.

The user terminal 1500 is capable of storing and executing an application program. As the application program, a terminal program 502 is stored. The terminal program 502 causes the user terminal 1500 to implement the following functions (1) to (3), namely, (1) a function of accessing the server system 1100, (2) a function of issuing a predetermined unlock request to the vehicle-mounted device 10 according to an unlock operation by the user, and causing the vehicle-mounted device 10 to perform unlocking by providing the reservation information 700t, and (3) a function of communicatively connecting to the vehicle-mounted device 10 according to a lock operation by the user to issue a predetermined lock request, and causing the vehicle-mounted device 10 to perform locking by providing the reservation information 700t.

Figure 2:
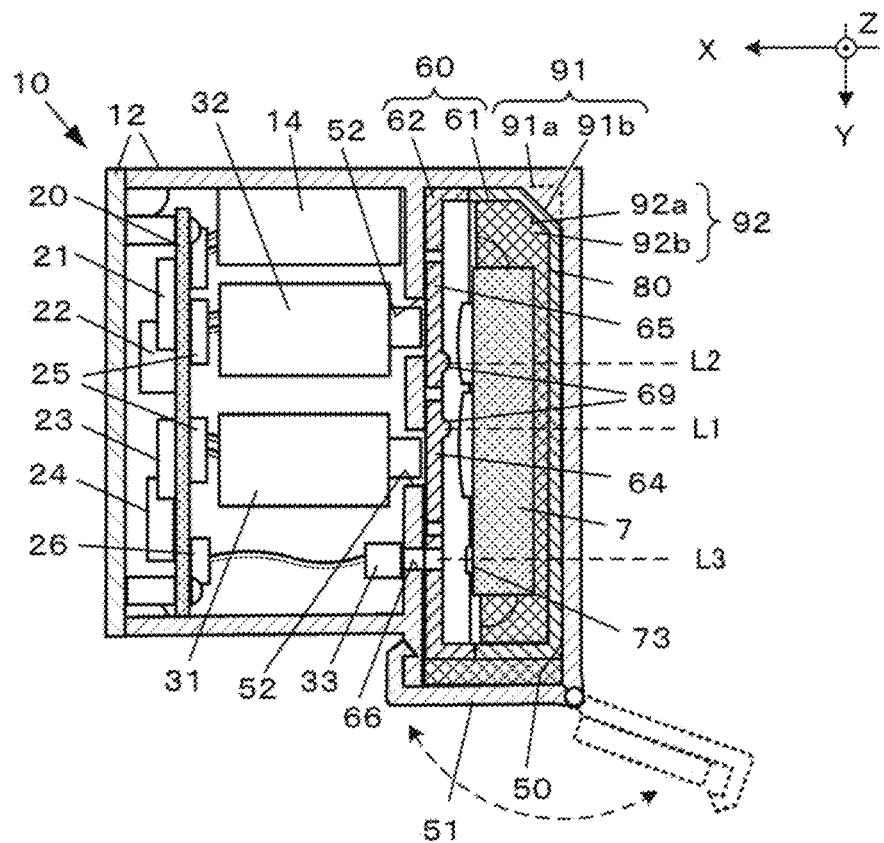
FIG. 2 is a cross-sectional view illustrating an example configuration of a vehicle-mounted device.

FIG. 2 is an XY cross-sectional view illustrating an example configuration of the vehicle-mounted device 10 of the present embodiment.

Figure 3:
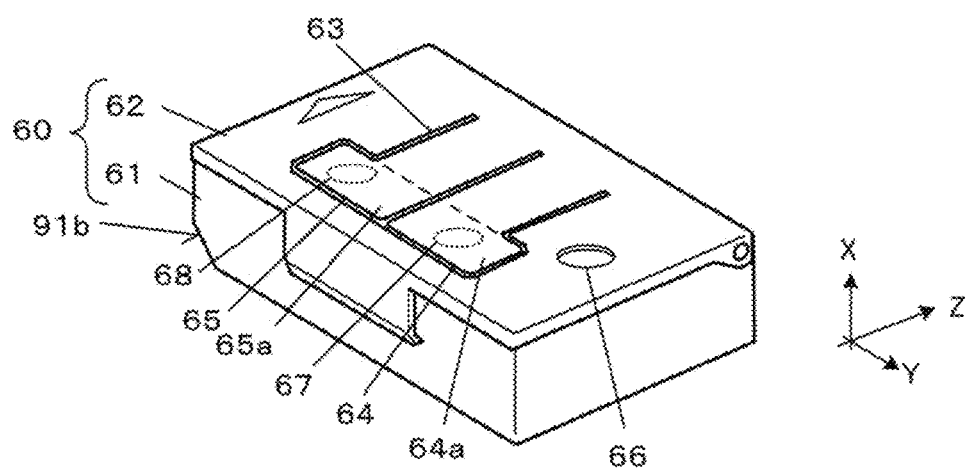
FIG. 3 is an external perspective view illustrating an example configuration of an inner case (Case 1).
Figure 4:
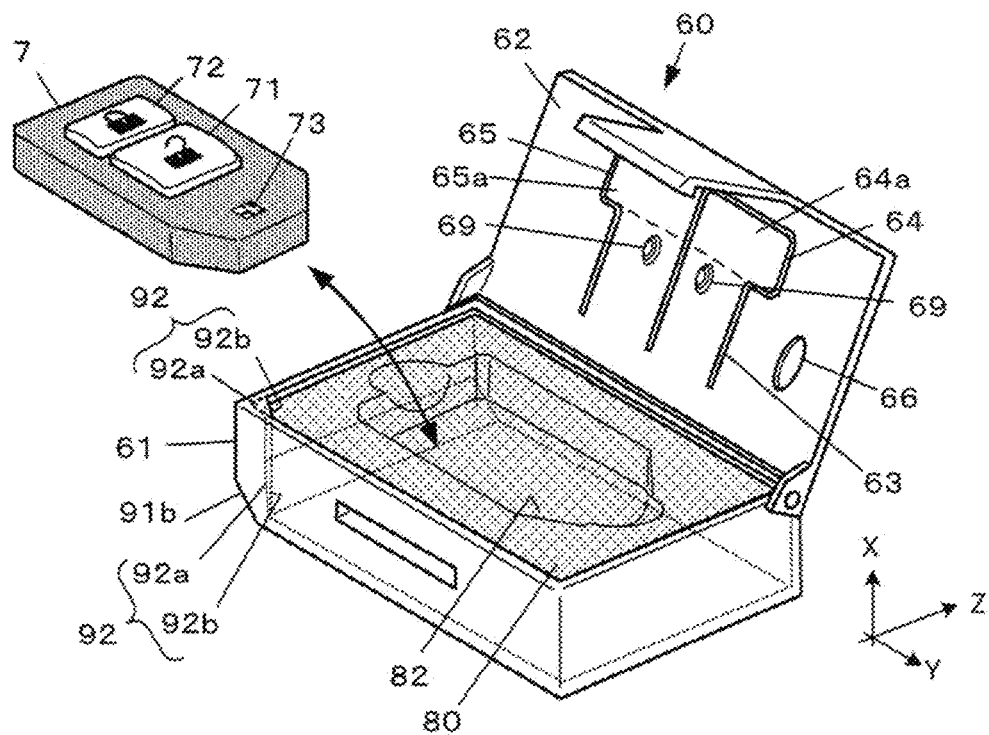
FIG. 4 is an external perspective view illustrating an example configuration the inner case (Case 2).

FIG. 3 and FIG. 4 are external perspective views illustrating an example configuration of an inner case 60 that is accommodated in the vehicle-mounted device 10. FIG. 3 illustrates a state where the inner case 60 is closed. FIG. 4 illustrates a state where the inner case 60 is open.

The vehicle-mounted device 10 is a key control device that performs unlock operation/lock operation on the electronic key 7 that is accommodated, according to unlock request/lock request from the user terminal 1500, and is a vehicle-mounted device that is attached inside the vehicle 5 as the sharing target. A control board 20, a first actuator 31, a second actuator 32, an accommodation sensor 33, and a built-in battery 14 are embedded in the vehicle-mounted device 10, on a forward side inside an outer case 12. The vehicle-mounted device 10 includes, on a rearward side inside the outer case 12, an accommodation unit 50 (the accommodation unit can also be referred to as an "accommodator") for accommodating the genuine electronic key 7 that comes with the vehicle 5 as the sharing target.

A power source of the vehicle-mounted device 10 is not limited to the built-in battery 14, and may alternatively be a vehicle battery. In this case, power may be constantly supplied to the vehicle-mounted device 10 through power supply connection with the vehicle battery, or it is possible to switch between supply/non-supply of power depending on whether the electronic key 7 is mounted or not.

The control board 20 includes electronic components and various circuits such as a central processing unit (CPU) 21, an IC memory 22, a first wireless communication module 23, a second wireless communication module 24, a power control circuit 25 that controls power supply to the first actuator 31 and the second actuator 32, and an interface IC 26. The interface IC 26 enables input/output of signals from the first wireless communication module 23, the second wireless communication module 24, and the accommodation sensor 33. The control board 20 controls the operation of the vehicle-mounted device 10 in an integrated manner by executing programs stored in the IC memory 22 by the CPU 21.

The first wireless communication module 23 connects to the network 9 (specifically, a wireless communication network such as a mobile network or a wireless LAN), and communicatively connects to the server system 1100 that manages reservation of the vehicle 5 as the sharing target.

The second wireless communication module 24 performs short-range wireless communication, and communicatively connects to the user terminal 1500 that is present within a communication range having the vehicle 5 at the center.

The first actuator 31 and the second actuator 32 are mechanical units that perform a button pressing operation (an operation of pressing a button switch) by being controlled by the control board 20. For example, the first actuator 31 and the second actuator 32 are each implemented by an electric actuator. In the case where the motion of an electric actuator that is adopted is not linear motion, a mechanical unit for converting the motion into linear motion (such as a lever mechanism, a booster mechanism, or a cam mechanism) may be provided as appropriate together with the electric actuator. The first actuator 31 and the second actuator 32 are set to operate in a direction of pressing down a button on the electronic key 7 that is accommodated in the accommodation unit 50 (that is, an X-axis negative direction in the example in FIG. 1).

The accommodation sensor 33 is a sensor for detecting that the electronic key 7 is accommodated in the accommodation unit 50 at a correct orientation. The accommodation sensor 33 is a sensor for determining an accommodation state in the manner of "accommodated at a correct orientation", "accommodated at a wrong orientation", or "not accommodated".

For example, in the case where the accommodation sensor 33 is implemented by a distance sensor, a first reference distance, a second reference distance, and a third reference distance are set in advance in the vehicle-mounted device 10. The first reference distance is a reference distance for a case where the electronic key 7 is already accommodated at a correct orientation. The second reference distance is a reference distance indicating an empty state where the electronic key 7 is not accommodated. The third reference distance is a reference distance indicating a state where the electronic key 7 is accommodated at a wrong orientation such as by being vertically or horizontally inverted. That the electronic key 7 is accommodated in the accommodation unit 50 at a correct orientation is detected by checking the distance that is measured by the accommodation sensor 33 against the above-mentioned reference distances.

Furthermore, for example, in the case where the accommodation sensor 33 is implemented by an image sensor, accommodation of the electronic key 7 in the accommodation unit 50 at a correct orientation is detected based on whether or not a captured image is an image of a marker sticker 73 with a unique pattern that is attached to the electronic key 7. In this case, the accommodation sensor 33 is to function as a marker detection unit that detects a predetermined marker on the electronic key 7 that is accommodated in the accommodation unit 50. In the present embodiment, the accommodation sensor 33 is described to be implemented by the image sensor.

Furthermore, for example, in the case where the accommodation sensor 33 is implemented by a code reader, accommodation of the electronic key 7 in the accommodation unit 50 at a correct orientation may be detected by reading a code sticker attached to the electronic key 7 and authenticating that the code indicates a correct orientation.

Furthermore, for example, in the case where the accommodation sensor 33 is implemented by a photoelectric sensor, a tag sticker that is capable of reflecting light is stretched and attached to the electronic key 7. An amount of reflected light from the tag sticker when the electronic key 7 is accommodated at a correct orientation is set in advance as a reference value, and the accommodation state may be determined by comparing the reference value and an amount of received light.

The accommodation unit 50 accommodates the inner case 60, and the inner case 60 to be accommodated may be placed in and taken out by opening an open/close portion 51. A small clearance is present between an inner surface of the accommodation unit 50 and an outer surface of the inner case 60 in an accommodated state. Due to this gap, the inner surface of the accommodation unit 50 functions as a guide rail at the time of placement or removal of the inner case 60.

The accommodation unit 50 and the inner case 60 include a first erroneous-assembly prevention structure 91 that allows the inner case 60 to be accommodated in the accommodation unit 50 only at a predetermined orientation. The first erroneous-assembly prevention structure 91 may be set as appropriate. For example, as illustrated in FIG. 2, a protruding portion (in the example in FIG. 2, a slant face-shaped protruding portion at an upper right portion in the drawing; a first erroneous-assembly prevention structure 91a on the accommodation unit side) may be formed in a deep corner of an inner space in the accommodation unit 50, and a recessed portion (in the example in FIG. 2, a chamfered recessed portion at an upper right corner of the inner case 60; a first erroneous-assembly prevention structure 91b on the inner case side) corresponding to the protruding portion may be formed on the inner case 60.

The outer case 12 includes a partition wall at a boundary of the accommodation unit 50 in a front-back direction, and actuator insertion holes 52 that allow movable portions of the first actuator 31 and the second actuator 32 to be inserted into the accommodation unit 50 and a sensor window 66 for the accommodation sensor 33 are opened in the partition wall.

The inner case 60 is an open/close case that is made of synthetic resin having elasticity, and the inner case 60 stores an attachment 80 in an exchangeable manner.

As illustrated in FIGS. 2 and 4, the inner case 60 and the attachment 80 include a second erroneous-assembly prevention structure 92 that allows the attachment 80 to be stored in the inner case 60 only at a predetermined orientation. The second erroneous-assembly prevention structure 92 may be set as appropriate. For example, the inner case 60 includes, as a second erroneous-assembly prevention structure 92a on the inner case side, a slant face-shaped protruding portion at a position that comes at a lower right part when the inner case 60 is accommodated in the accommodation unit 50 (a corner portion in a Y-axis negative direction and a Z-axis negative direction; an upper right corner portion on the page of FIG. 2; a far left corner portion on the page of FIG. 4). The attachment 80 includes a chamfered portion as a second erroneous-assembly prevention structure 92b on the attachment side, at a position corresponding to the protruding portion of the inner case 60.

The inner case 60 includes an open/close cover 62 on a front side of a case main body 61 (on a right side on the page of FIG. 2; an upper surface on the pages of FIGS. 3 and 4). The attachment 80 that is stored in the case may be exchanged or the electronic key 7 that is fitted and held in the attachment 80 may be removed by opening the open/close cover 62.

Additionally, in the present embodiment, the inner case 60 and the attachment 80 correspond to "holding unit for holding the electronic key". The holding unit can also be referred to as a "holder."

A first swing piece 64 and a second swing piece 65 whose peripheral edge portions are formed by a cutout groove 63, and the sensor window 66 to be used by the accommodation sensor 33 are formed in the open/close cover 62.

The cutout groove 63 does not extend along edge portions of the first swing piece 64 and the second swing piece 65 on a Z-axis positive side. The first swing piece 64 and the second swing piece 65 swing in the front-back direction (the X-axis direction; a left-right direction on the page of FIG. 2; a vertical direction on the pages of FIGS. 3 and 4) with the edge portions as swing support points. The swing direction coincides with a direction of the button pressing operation of the first actuator 31 and the second actuator 32. Dotted oval marks in FIG. 3 indicate a first intended button pressing position 67 to be pressed by the button pressing operation by the first actuator 31, and a second intended button pressing position 68 to be pressed by the button pressing operation by the second actuator 32, respectively.

A swing end portion 64a of the first swing piece 64 is formed at a position that faces the actuator insertion hole 52 (see FIG. 2) for the first actuator 31 in a state where the inner case 60 is accommodated in the accommodation unit 50. Similarly, a swing end portion 65a of the second swing piece 65 is formed at a position that faces the actuator insertion hole 52 (see FIG. 2) for the second actuator 32 in a state where the inner case 60 is accommodated in the accommodation unit 50.

The swing end portion 64a of the first swing piece 64 and the swing end portion 65a of the second swing piece 65 are wider in the left-right direction (the Y-axis direction) than the edge portions as the swing support points. Because of the great widths of the swing end portions 64a, 65a, a slight shift of the position to be pressed by the button pressing operation by the first actuator 31 from the first intended button pressing position 67 may be allowed. The same can be said for the position to be pressed by the button pressing operation by the second actuator 32. Because the widths of the swing end portions 64a, 65a are increased, a wide gap may be secured between the first intended button pressing position 67 and the second intended button pressing position 68, and the freedom of design may be increased in relation to a layout of arrangement of two actuators in the outer case 12.

A protruding portion 69 is formed protruding from an inner surface of each of the first swing piece 64 and the second swing piece 65. The protruding portion 69 of the first swing piece 64 is arranged at a position that faces the unlock button 71 of the electronic key 7 that is stored in the inner case 60, and the protruding portion 69 of the second swing piece 65 is arranged at a position that faces the lock button 72.

Figure 5:
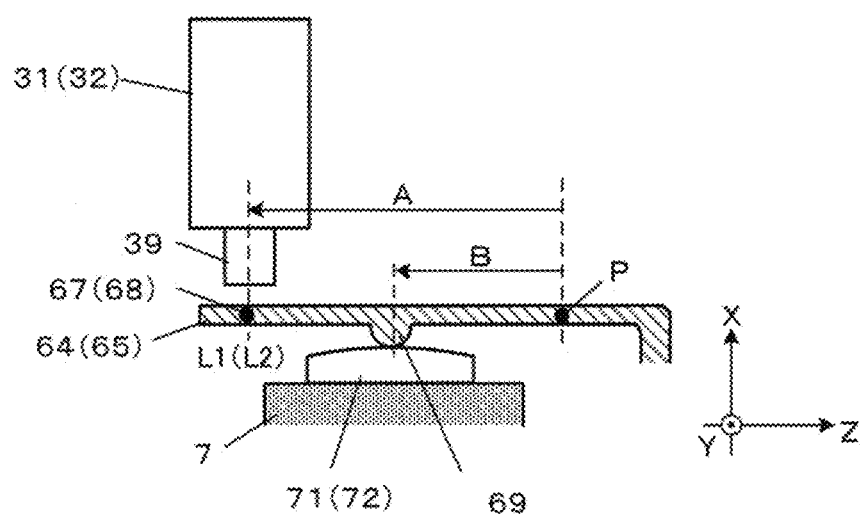
FIG. 5 is a schematic view for describing a positional relationship between positions to be pressed by a first actuator and a second actuator and protruding portions of a first swing piece and a second swing piece.

As illustrated in FIG. 5, the protruding portion 69 of the first swing piece 64 is shifted toward a swing support point P of the first swing piece 64 relative to the first intended button pressing position 67 to be pressed by the first actuator 31. Similarly, the protruding portion 69 of the second swing piece 65 is shifted toward the swing support point of the second swing piece 65 relative to the second intended button pressing position 68 to be pressed by the second actuator 32. Effects as described below may be obtained by such shift of the protruding portions 69.

First, thanks to the principle of leverage, the unlock button 71 and the lock button 72 may be pressed with a greater force than a pressing force of the first actuator 31 and the second actuator 32 (in the example in FIG. 5, a force of A/B times).

Second, the unlock button 71 and the lock button 72 may be protected. Specifically, an operating stroke (the amount of movement) of movable portions 39 of the first actuator 31 and the second actuator 32 has to be set to a certain size so that the button pressing operations may be reliably performed while absorbing dimensional variation of components, assembly variation and the like. In the case where the operating stroke of the movable portions 39 is greater than a stroke that is necessary to operate the unlock button 71 and the lock button 72, if the protruding portions 69 are not shifted, the unlock button 71 and the lock button 72 are possibly overly pressed by operation of the actuators.

However, by arranging the protruding portions 69 in a shifted manner, a stroke with which the protruding portions 69 actually press down the unlock button 71 and the lock button 72 may be made smaller than the operating stroke of the actuators due to a lever ratio, and excessive pressing may be prevented.

Furthermore, by arranging the protruding portions 69 in a shifted manner, a part that elastically deforms may be provided between a position to be pressed by the actuator (the first intended button pressing position 67, the second intended button pressing position 68) and a position at which the unlock button 71 or the lock button 72 is pressed (the protruding portion 69), and an excessive force that acts on the unlock button 71 or the lock button 72 may be absorbed by the elastic deformation.

To better protect the unlock button 71 and the lock button 72, highly elastic members may be further attached at tips of the protruding portions 69, or the protruding portions 69 themselves may be made of highly elastic material and be attached to the first swing piece 64 and the second swing piece 65.

The attachment 80 that is made of hard sponge and that is prepared in a dedicated manner for a corresponding type of electronic key 7 is removably fitted and stored in the inner case 60, and the electronic key 7 is held by the attachment 80. A force with which the attachment 80 holds the electronic key 7 is set to such a degree that a user may attach or remove the electronic key 7 by pulling the electronic key 7 by hooking a finger thereto, without using any tool. Because the attachment 80 is made of hard sponge, attachment/removal may be easily performed, due to appropriate elastic deformation, at the time of attachment/removal of the attachment 80 from the inner case 60 and attachment/removal and holding of the electronic key 7 by the attachment 80, and also, close contact and holding force may be appropriately generated at the time of attachment due to restoration of elastic deformation. Furthermore, because impact from outside can be absorbed, even if the user drops by mistake the inner case 60 that is being carried, for example, the electronic key 7 may be protected from the impact. The attachment 80 is not limited to be made of hard sponge, and the material may be changed as appropriate as long as attachment/removal from the inner case 60 and attachment/removal and holding of the electronic key 7 are enabled.

The attachment 80 includes a recessed holding portion 82 where the electronic key 7 can be fitted from a back side (a side opposite from the unlock button 71 and the lock button 72). A shape of the recessed holding portion 82 and an installation position of the recessed holding portion 82 in the attachment 80 are designed in a dedicated manner according to the type of the electronic key 7.

Figure 6A:
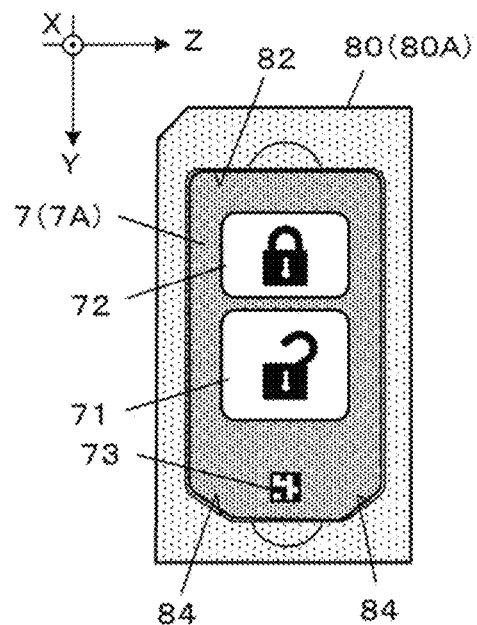
FIG. 6A is a front view illustrating example variations of an electronic key and an attachment (Case 1).
Figure 6B:
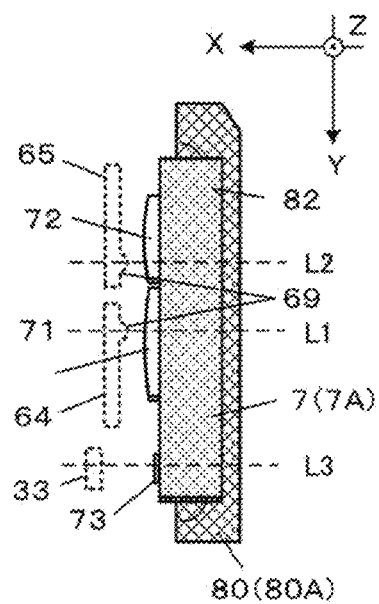
FIG. 6B is a side view illustrating a cross-section of the example variations of the electronic key and the attachment (Case 1).
Figure 7A:
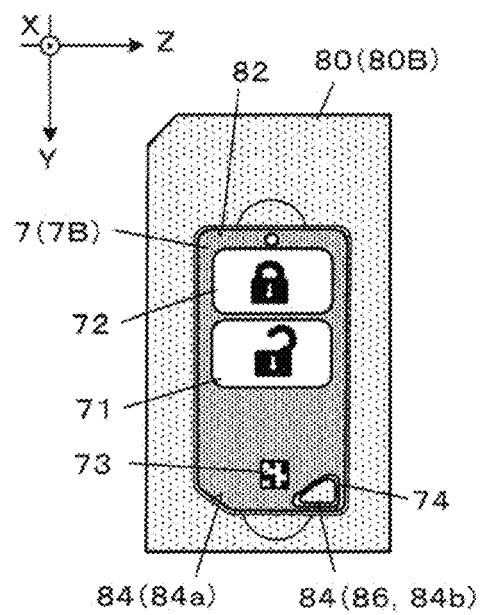
FIG. 7A is a front view illustrating example variations of the electronic key and the attachment (Case 2).
Figure 7B:
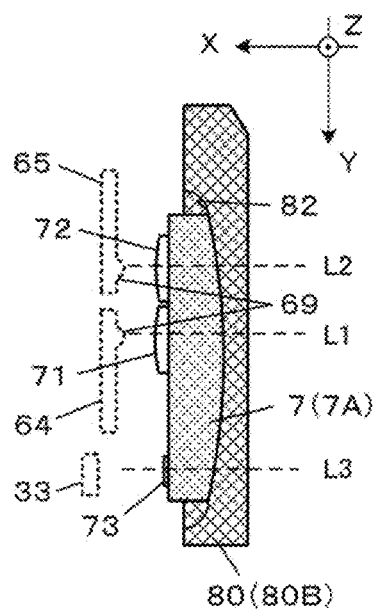
FIG. 7B is a side view illustrating a cross-section of the example variations of the electronic key and the attachment (Case 2).
Figure 8A:
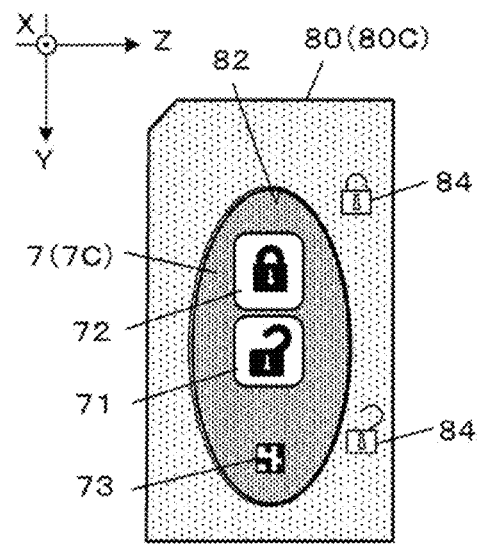
FIG. 8A is a front view illustrating example variations of the electronic key and the attachment (Case 3).
Figure 8B:
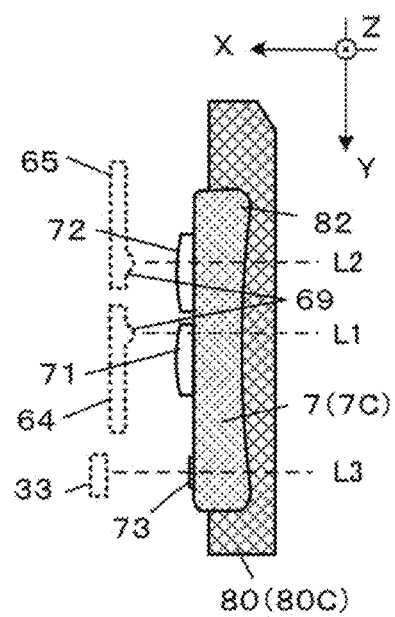
FIG. 8B a side view illustrating a cross-section of the example variations of the electronic key and the attachment (Case 3).

FIGS. 6 to 8 are diagrams illustrating example variations of the electronic key 7 and the attachment 80, where states where the electronic key 7 is fitted and held by the attachment 80 are illustrated. FIGS. 6A, 7A, and 8A illustrate front views. FIGS. 6B, 7B, and 8B are side views illustrating the electronic key 7 and the attachment 80 illustrated in cross-section. Long-dashed lines that are parallel to the X-axis in the side views roughly indicate, from the top of the drawings, an opposite position L2 to the protruding portion 69 of the second swing piece 65, an opposite position L1 to the protruding portion 69 of the first swing piece 64, and an opposite position L3 to the sensor window 66 for the accommodation sensor 33. The opposite positions L1 to L3 are also illustrated in FIG. 2.

FIGS. 6A and 6B illustrate an electronic key 7A of a first type and an attachment 80A of a first type. FIGS. 7A and 7B illustrate an electronic key 7B of a second type and an attachment 80B of a second type. FIGS. 8A and 8B illustrate an electronic key 7C of a third type and an attachment 80C of a third type. In actual operation, types of the electronic keys and the number of corresponding attachments are not particularly limited.

The attachment 80 includes a holding orientation guide 84 that allows the user to grasp the correct holding orientation at which the electronic key 7 is fitted with a front side where the unlock button 71 and the lock button 72 are disposed at the top (the open/close cover 62 side). The holding orientation guide 84 mainly uses a characteristic asymmetric outer shape of the electronic key 7. Additionally, in the case of an electronic key 7 whose shape has no characteristics, the holding orientation guide 84 that is a recessed portion functions only as a hole where the electronic key 7 is to be fitted, and the user is possibly not allowed to grasp the correct holding orientation.

The shape of the electronic key 7 varies depending on the vehicle. The shape of the recessed holding portion 82 is designed in a dedicated manner according to the shape of the corresponding electronic key 7 such that the electronic key 7 can be attached/removed. Accordingly, the recessed holding portion 82 includes a part that shows the characteristic shape of the electronic key 7, and such a part functions as the holding orientation guide 84.

For example, in relation to the electronic key 7A in FIGS. 6A and 6B, a Y-axis positive side of the electronic key 7A is chamfered. Slant faces are formed on the recessed holding portion 82 of the attachment 80A, at parts corresponding to the chamfered parts. The parts corresponding to the chamfered parts, or in other words, the slant faces, each correspond to the holding orientation guide 84. When the electronic key 7A is fitted according to the shape of the recessed holding portion 82, the chamfered parts that are the characteristics of the shape of the electronic key 7A are fitted with the slant faces (the holding orientation guides 84) of the attachment 80. Then, the entire electronic key 7A is fitted according to the shape of the recessed holding portion 82, with an operation surface (a front surface as the key) at the top. Furthermore, a predetermined positional relationship is achieved where the unlock button 71 faces the first swing piece 64 and the lock button 72 faces the second swing piece 65.

The electronic key 7B in FIGS. 7A and 7B has a rectangular shape in plan view, and one of four corners of the rectangle is a chamfered portion and another one is a key holder hole 74. The recessed holding portion 82 of the attachment 80B includes a slant portion at a part corresponding to the chamfered portion of the electronic key 7B, and this slant portion is a first holding orientation guide 84a. The recessed holding portion 82 of the attachment 80B includes a protruding portion 86 that fits the key holder hole 74 when the electronic key 7B is attached at a correct orientation, and the protruding portion 86 is a second holding orientation guide 84b.

The chamfered portion that is the characteristic shape of the electronic key 7B is fitted with the slant portion (the first holding orientation guide 84a) of the attachment 80B. Then, the key holder hole 74 of the electronic key 7B is fitted with the protruding portion 86 (the second holding orientation guide 84b). The electronic key 7B is fitted according to the shape of the recessed holding portion 82, with the entire operation surface at the top. Furthermore, a predetermined positional relationship is achieved where the unlock button 71 faces the first swing piece 64 and the lock button 72 faces the second swing piece 65.

The electronic key 7C in FIGS. 8A and 8B is not chamfered on an outer circumference, but has an oval shape in plan view, and the oval shape is the characteristic shape. The recessed holding portion 82 of the attachment 80C is formed into a shape that matches the oval shape of the electronic key 7C (that is, a shape that does not have a characteristic asymmetric shape). The attachment 80C includes, as the holding orientation guides 84, marks that indicate the unlock button 71 and the lock button 72, at an edge portion outside the recessed holding portion 82.

The electronic key 7C is fitted with the operation surface at the top by positioning an outer edge portion of the electronic key 7C with the edge portion outside the recessed holding portion 82 of the attachment 80C in such a way that the lock button 72 and the unlock button 71 are arranged in an order according to an arrangement order of the marks corresponding to the holding orientation guides 84. With the electronic key 7C, a predetermined positional relationship is achieved where the unlock button 71 faces the first swing piece 64 and the lock button 72 faces the second swing piece 65.

As illustrated in FIG. 2 and FIGS. 6 to 8, the positional relationship of the opposite positions L1 to L3 is set according to installation distances of the first actuator 31, the second actuator 32, and the accommodation sensor 33. For its part, the recessed holding portion 82 of the attachment 80 has its shape and position set such that the unlock button 71 of the electronic key 7 that is held faces the protruding portion 69 of the first swing piece 64 and the lock button 72 faces the protruding portion 69 of the second swing piece 65.

The inner case 60 is commonly used for different attachments 80. It is set such that, even though the inner case 60 is to store different attachments 80, when an attachment 80 holds a corresponding electronic key 7, intended button pressing positions (the first intended button pressing position 67, the second intended button pressing position 68; see FIG. 3) at which buttons (the unlock button 71 and the lock button 72) on the electronic key 7 can be pressed come at same positions relative to the inner case 60.

A thickness of the electronic key 7 is different depending on the type, but by appropriately setting a depth of the recessed holding portion 82, the first swing piece 64 and the second swing piece 65 may be caused to swing by the button pressing operations by the first actuator 31 and the second actuator 32 to reliably press the unlock button 71 and the lock button 72 with the respective protruding portions 69.

Accordingly, even when sizes and arranged positions of the unlock button 71 and the lock button 72 change depending on the type of the electronic key 7, the button pressing operations by the first actuator 31 and the second actuator 32 may be transmitted to the unlock button 71 and the lock button 72 via the first swing piece 64 and the second swing piece 65 to cause the same to operate. That is, by selecting the type of the attachment 80 to be used according to the type of the electronic key 7 of the vehicle 5 where the vehicle-mounted device 10 is to be mounted, the vehicle-mounted device 10 corresponding to various types of electronic keys 7 may be implemented.

Next, an operation of the sharing system 3 will be described.

Figure 9:
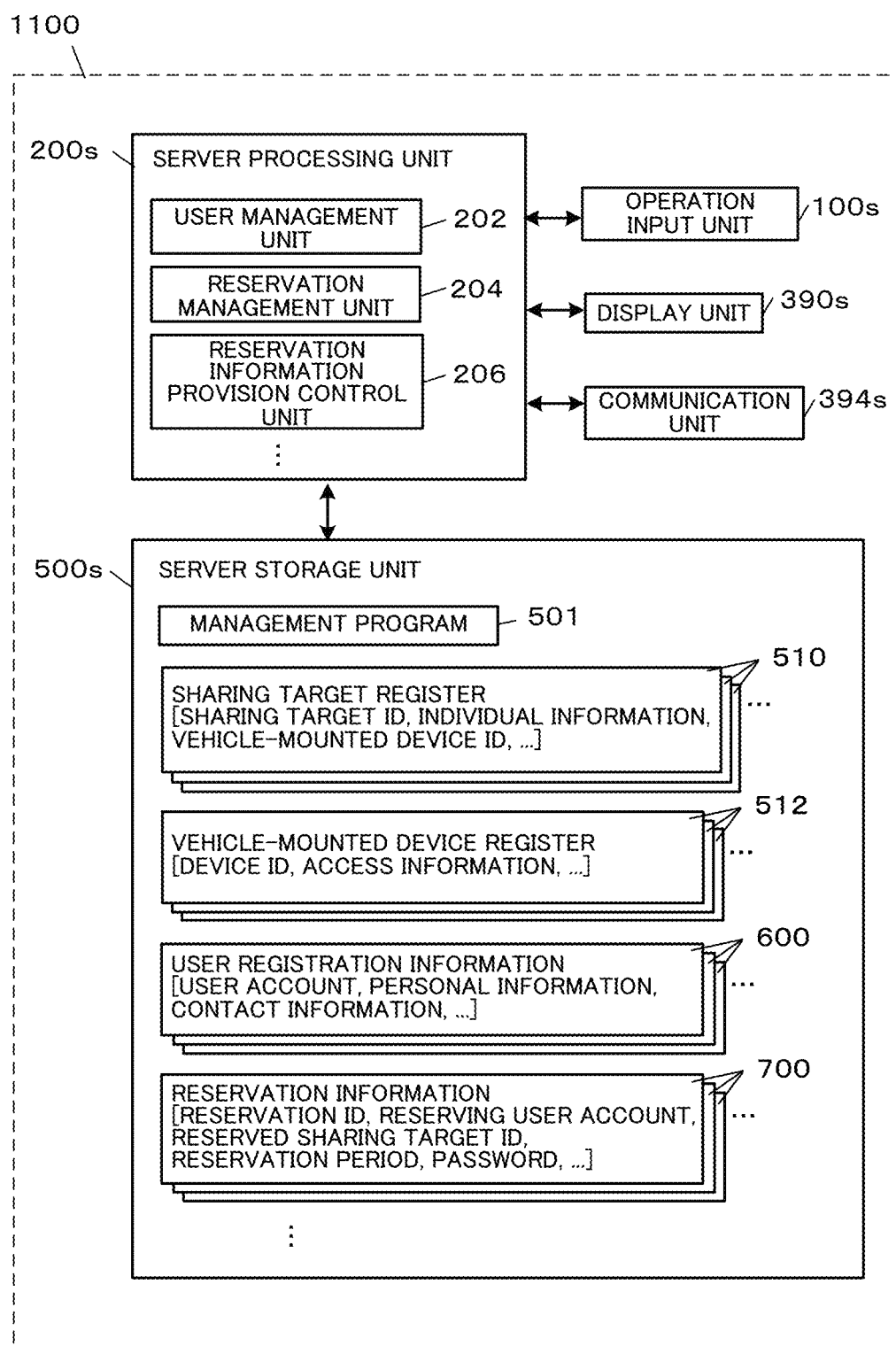
FIG. 9 is a functional block diagram illustrating an example functional configuration of a server system.

FIG. 9 is a functional block diagram illustrating an example functional configuration of the server system 1100. The server system 1100 includes an operation input unit 100s, a server processing unit 200s, a display unit 390s, a communication unit 394s, and a server storage unit 500s.

The operation input unit 100s is a functional unit for inputting various operations for system management, maintenance and the like, and may be implemented by a keyboard and a mouse, a touch panel or the like, for example.

The server processing unit 200s is implemented by an arithmetic circuit such as a CPU, a graphics processing unit (GPU), an application specific integrated circuit (ASIC) or a field-programmable gate array (FPGA), and an electronic component such as an IC memory, for example, and the server processing unit 200s performs input/output control of data to/from each unit of the device, and controls the operation of the server system 1100 in an integrated manner by performing various types of arithmetic processing based on predetermined programs and data, operation input signals from the operation input unit 100s, data received from the user terminal 1500, and the like.

The server processing unit 200s includes a user management unit 202 and a reservation management unit 204. The server processing unit 200s may also include other functional units (such as a function of storing and updating current date/time).

The user management unit 202 performs processes related to user registration. Specifically, the user management unit 202 assigns a unique account to a user in response to a user registration request from the user terminal 1500. The user management unit 202 registers and manages user registration information 600 by transmitting/receiving data necessary for registration to/from the user terminal 1500.

The user registration information 600 is created for each user for whom registration procedure is completed, and is stored in the server storage unit 500s. One piece of user registration information 600 incudes a unique user account, personal information (such as name, address, age, sex, and driver's license number), and contact information (such as telephone number and email address), for example.

The reservation management unit 204 performs processes related to reservation of a sharing target. Specifically, data necessary for reservation is transmitted/received to/from the user terminal 1500 in response to a reservation request from the user terminal 1500, and the reservation information 700 is created, registered and managed on a per reservation request basis.

The reservation information 700 is created for each completed reservation procedure, and is stored in the server storage unit 500s. One piece of reservation information 700 includes a unique reservation ID, a reserving user account, a reserved sharing target ID, a reservation period, and a unique password. The reservation management unit 204 provides a copy (the reservation information 700t in FIG. 1) of the created reservation information 700, as a duplicate, to the user terminal 1500 that made the reservation request. The reservation management unit 204 deletes the reservation information 700 in relation to which the reservation period is over or use based on the reservation is ended.

The reservation information provision control unit 206 refers to a sharing target register 510 and a vehicle-mounted device register 512, and performs control to extract the reservation information 700 that is not yet fulfilled and that is for the vehicle 5 that is the sharing target and to provide the reservation information 700 to the vehicle-mounted device 10 mounted on the vehicle (the reservation information 700c in FIG. 1).

The sharing target register 510 is prepared for each sharing target, and includes a unique sharing target ID, individual information (such as manufacturer, vehicle type, color, registration number, vehicle identification number, and the like), and a device ID of the vehicle-mounted device 10 that is used in the sharing target. Other pieces of data may also be included as appropriate.

The vehicle-mounted device register 512 is created for each vehicle-mounted device 10, and stores a unique device ID, and access information (such as mobile phone number, MAC address, access code or the like) for performing data communication with the device in question. Other pieces of data may also be included as appropriate.

The display unit 390s is implemented by a display device such as a flat-panel display, and the display unit 390s displays various screens for system management and the like.

The communication unit 394s connects to a predetermined communication line such as a wireless communication line or a LAN, and performs data communication with an external device (such as the user terminal 1500 and the vehicle-mounted device 10) over the network 9, and is implemented by a wireless communication module, a modem, a TA or the like for connecting to a mobile network or a wireless LAN.

The server storage unit 500s stores, in advance or temporarily for each process, programs for causing the server processing unit 200s to operate and for implementing various functions of the server system 1100, data to be used during execution of the programs, and the like, and is implemented by an IC memory such as a RAM or a ROM, a magnetic disk such as a hard disk, an optical disk, an online storage or the like, for example. The server storage unit 500s stores the management program 501, the sharing target register 510, the vehicle-mounted device register 512, the user registration information 600, and the reservation information 700. Other pieces of data (such as current date/time) may also be stored as appropriate.

The server processing unit 200s executes the management program 501 to implement functions of the user management unit 202, the reservation management unit 204, and the reservation information provision control unit 206.

Figure 10:
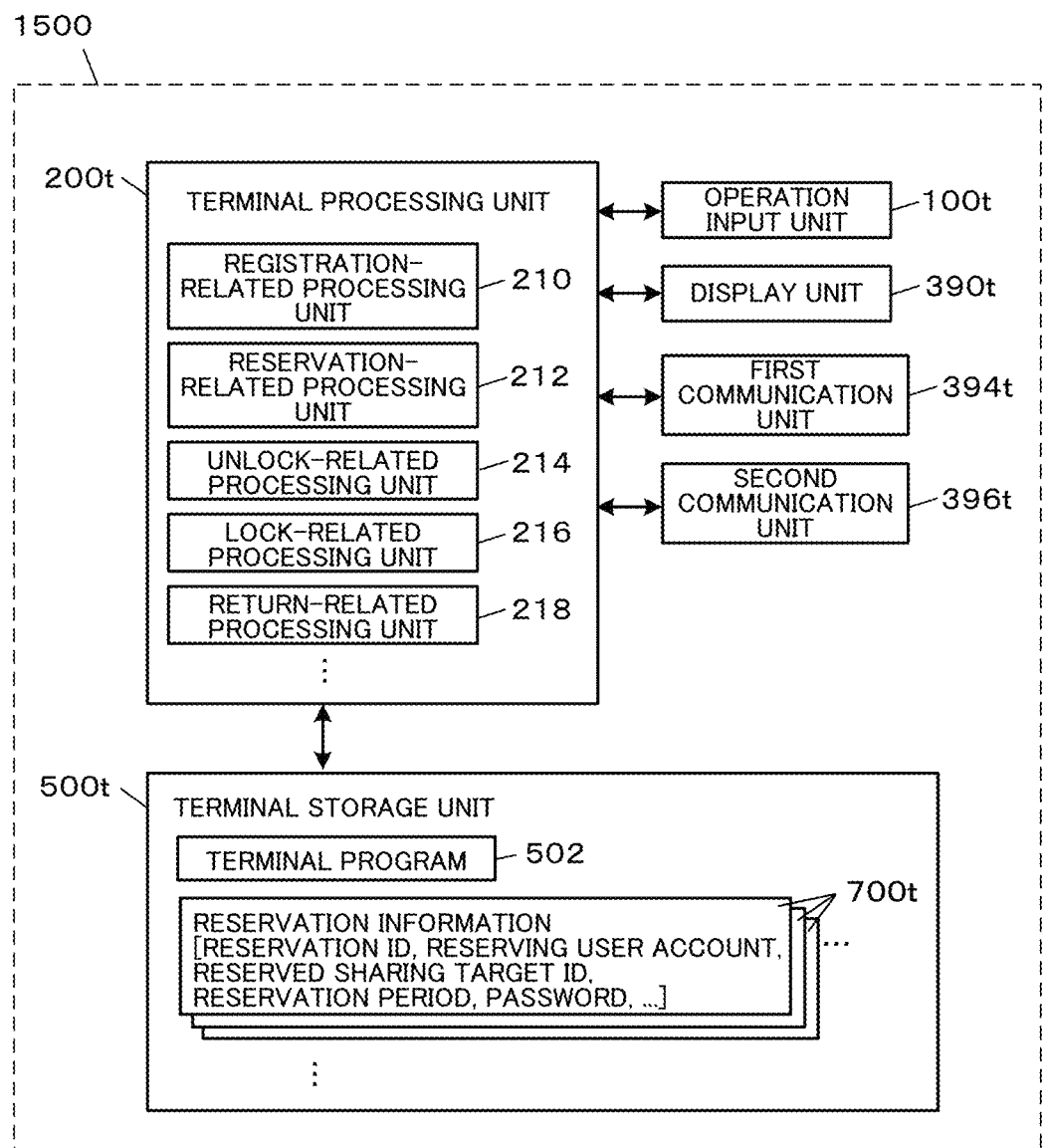
FIG. 10 is a functional block diagram illustrating an example functional configuration of a user terminal.

FIG. 10 is a functional block diagram illustrating an example functional configuration of the user terminal 1500. The user terminal 1500 includes an operation input unit 100t, a terminal processing unit 200t, a display unit 390t, a first communication unit 394t, a second communication unit 396t, and a terminal storage unit 500t.

The operation input unit 100t is used for input of various operations by the user, and may be implemented by a touch panel, a button switch or the like, for example.

The terminal processing unit 200t is implemented by an arithmetic circuit such as a CPU, a GPU, an ASIC or an FPGA, and an electronic component such as an IC memory, for example, and the terminal processing unit 200t performs input/output control of data to/from each unit of the device. The terminal processing unit 200t controls the operation of the user terminal 1500 in an integrated manner by performing various types of arithmetic processing based on predetermined programs and data, operation input signals from the operation input unit 100t, data received from the server system 1100 and the vehicle-mounted device 10, and the like, for example.

The terminal processing unit 200t includes a registration-related processing unit 210, a reservation-related processing unit 212, an unlock-related processing unit 214, a lock-related processing unit 216, and a return-related processing unit 218.

The registration-related processing unit 210 receives a user registration operation and notifies the server system 1100 of a user registration request, and performs a process related to a user registration procedure.

The reservation-related processing unit 212 receives a reservation setting operation by the user and notifies the server system 1100 of a reservation request, and performs a process related to a reservation procedure and a process of acquiring the reservation information 700t.

The unlock-related processing unit 214 notifies the vehicle-mounted device 10 of an unlock request by performing short-range wireless communication with the vehicle-mounted device 10 in response to an unlock operation by the user, and transmits the reservation information 700t and performs a process related to an unlock procedure for the sharing target that is reserved by the user.

The lock-related processing unit 216 notifies the vehicle-mounted device 10 of a lock request by performing short-range wireless communication with the vehicle-mounted device 10 in response to a lock operation by the user, and transmits the reservation information 700t and performs a process related to a lock procedure.

The return-related processing unit 218 notifies the vehicle-mounted device 10 of a return request by performing short-range wireless communication with the vehicle-mounted device 10 in response to a return operation by the user, and transmits the reservation information 700t and performs a process related to a return procedure.

The display unit 390t is implemented by a display device such as a flat-panel display, and the display unit 390t performs various types of display based on display signals from the terminal processing unit 200t.

The first communication unit 394t performs data communication with the server system 1100 over the network 9, and is implemented by a wireless communication module for connecting to a mobile network or a wireless LAN, for example.

The second communication unit 396t performs data communication with the vehicle-mounted device 10 over the network 9, and is implemented by a wireless communication module for short-range wireless communication, for example.

The terminal storage unit 500t stores, in advance or temporarily for each process, programs for implementing various functions of the user terminal 1500, data to be used during execution of the programs, and the like, and is implemented by an IC memory such as a RAM or a ROM, a magnetic disk such as a hard disk, an optical disk, an online storage or the like, for example. The terminal storage unit 500t stores the terminal program 502 and the reservation information 700t. Other pieces of data (such as current date/time) may also be stored as appropriate.

The terminal processing unit 200t executes the terminal program 502 to implement functions of the registration-related processing unit 210, the reservation-related processing unit 212, the unlock-related processing unit 214, the lock-related processing unit 216, and the return-related processing unit 218.

Figure 11:
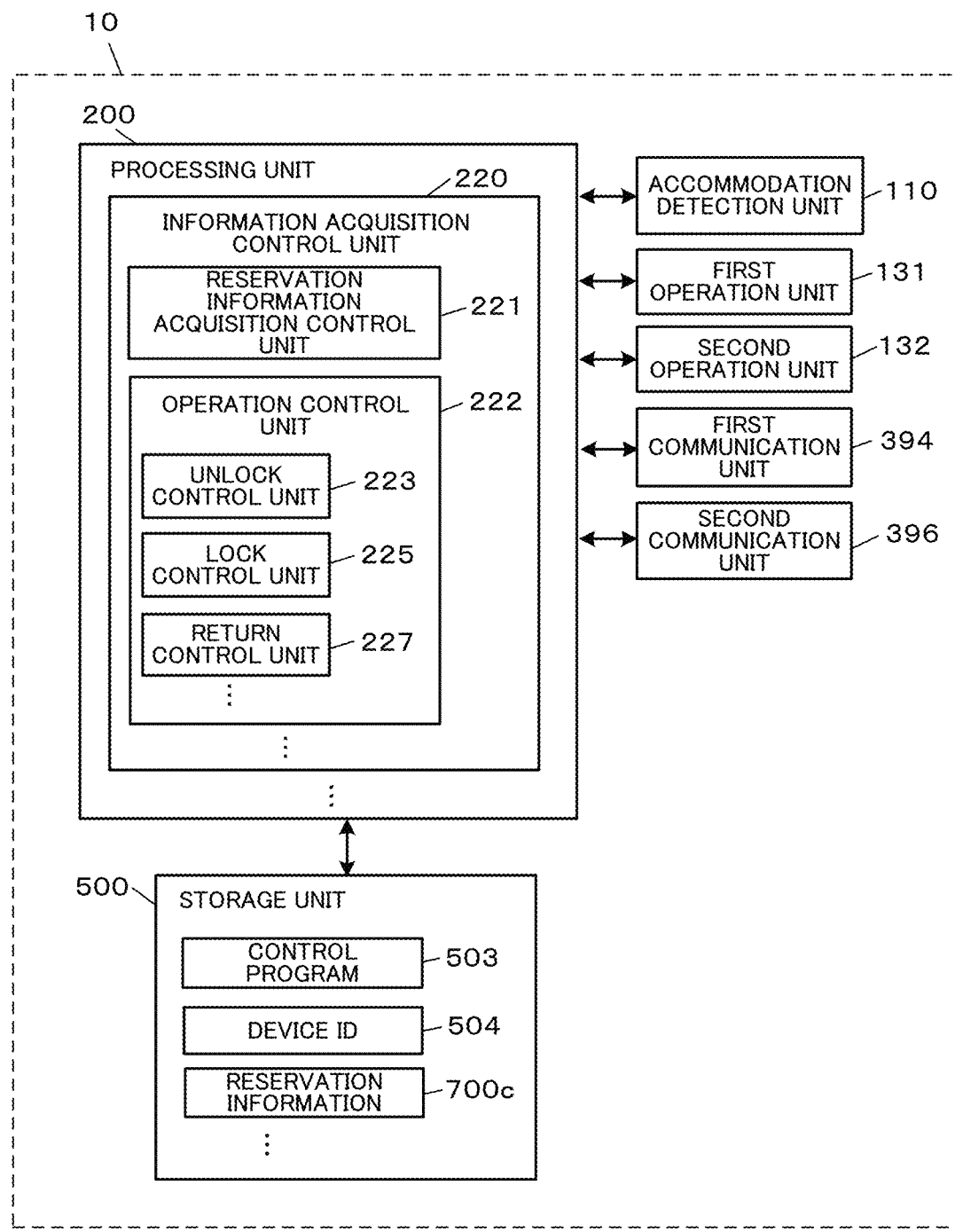
FIG. 11 is a functional block diagram illustrating an example functional configuration of the vehicle-mounted device.

FIG. 11 is a functional block diagram illustrating an example functional configuration of the vehicle-mounted device 10.

The vehicle-mounted device 10 includes an accommodation detection unit 110, a first operation unit 131, a second operation unit 132, a processing unit 200, a first communication unit 394, a second communication unit 396, and a storage unit 500.

The accommodation detection unit 110 is a functional unit for detecting that the electronic key 7 is accommodated, and is implemented by various sensors, an image sensor or the like. In the example in FIG. 2, the accommodation sensor 33 corresponds to the accommodation detection unit 110.

The first operation unit 131 and the second operation unit 132 each mechanically performs the button pressing operation, and are, specifically, each implemented by an actuator or a mechanical unit whose operation is controlled by the processing unit 200. In the example in FIG. 2, the first operation unit 131 corresponds to the first actuator 31, and the second operation unit 132 corresponds to the second actuator 32.

The first communication unit 394 performs data communication with the server system 1100 over the network 9, and is implemented by a wireless communication module for connecting to a mobile network or a wireless LAN, for example.

The second communication unit 396 performs data communication with the user terminal 1500 over the network 9, and is implemented by a wireless communication module for short-range wireless communication, for example.

The processing unit 200 includes an information acquisition control unit 220 that performs control to acquire certain information from an external device over the network 9. The information acquisition control unit 220 includes a reservation information acquisition control unit 221 and an operation control unit 222, and may further include other functional units (such as a function of storing and updating current date/time) as appropriate.

The reservation information acquisition control unit 221 performs control to acquire the reservation information 700 from the server system 1100. Specifically, the reservation information acquisition control unit 221 performs control to access the server system 1100 every predetermined period of time by using the first communication unit 394, transmit a predetermined information provision request together with a device ID 504, and cause the storage unit 500 to store, as the reservation information 700c, a copy of the reservation information 700 provided by the server system 1100 in response.

In the case where certain information is acquired, the operation control unit 222 causes the first actuator 31 to perform the button pressing operation. The operation control unit 222 includes an unlock control unit 223, a lock control unit 225, and a return control unit 227.

When a predetermined unlock request is received from the user terminal 1500, the unlock control unit 223 acquires the reservation information 700t from the user terminal in question, and determines validity of the unlock request by checking the reservation information 700t against the reservation information 700c stored in the storage unit 500. Specifically, the unlock request is determined to be valid when contents of the reservation information 700t and the reservation information 700c are the same and current date/time is within the reservation period. Then, in the case where the unlock request is valid, the unlock control unit 223 performs control to cause the first operation unit 131 to operate.

When a predetermined lock request is received from the user terminal 1500, the lock control unit 225 acquires the reservation information 700*t* from the user terminal 1500 in question, and determines validity of the lock request by checking the reservation information 700*t* against the reservation information 700*c* stored in the storage unit 500. Specifically, the lock request is determined to be valid when contents of the reservation information 700*t* and the reservation information 700*c* are the same and current date/time is within the reservation period. Then, in the case where the lock request is valid, the lock control unit 225 performs control to cause the second operation unit 132 to operate.

When a predetermined return request is received from the user terminal 1500, the return control unit 227 acquires the reservation information 700*t* from the user terminal in question, and determines validity of the return request by checking the reservation information 700*t* against the reservation information 700*c* stored in the storage unit 500. Specifically, the return request is determined to be valid when contents of the reservation information 700*t* and the reservation information 700*c* are the same and current date/time is within the reservation period or after the reservation period. Then, in the case where the return request is valid, the return control unit 227 detects that the electronic key 7 is accommodated using the accommodation detection unit 110, performs control to cause the second operation unit 132 to operate, and transmits a predetermined return notification to the server system 1100. In the case where that the electronic key 7 is accommodated is not detected, a predetermined key accommodation checking request is transmitted to the user terminal 1500, and the user terminal 1500 is caused to perform a process of urging the user to check an accommodation state of the electronic key 7.

The storage unit 500 stores, in advance or temporarily for each process, programs for causing the processing unit 200 to operate and for implementing various functions of the vehicle-mounted device 10, data to be used during execution of the programs, and the like, and is implemented by an IC memory such as a RAM or a ROM, for example. The storage unit 500 stores a control program 503, the unique device ID 504, and the reservation information 700*c*. Other pieces of data (such as current date/time) may also be stored as appropriate.

The processing unit 200 executes the control program 503 to implement functions of the reservation information acquisition control unit 221, the unlock control unit 223, the lock control unit 225, and the return control unit 227.

Figure 12:
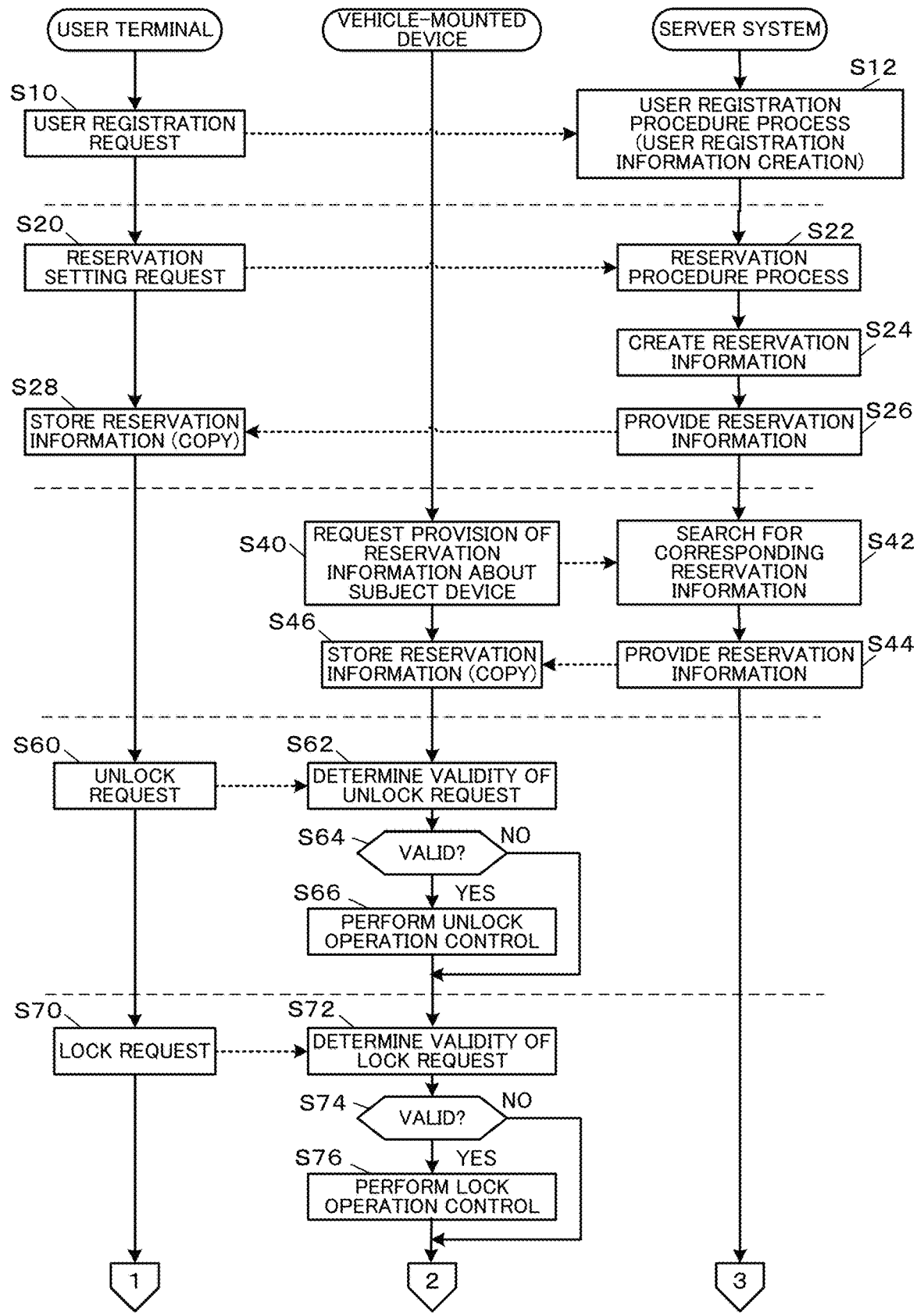
FIG. 12 is a flowchart for describing operations of the server system, the user terminal, and the vehicle-mounted device.
Figure 13:
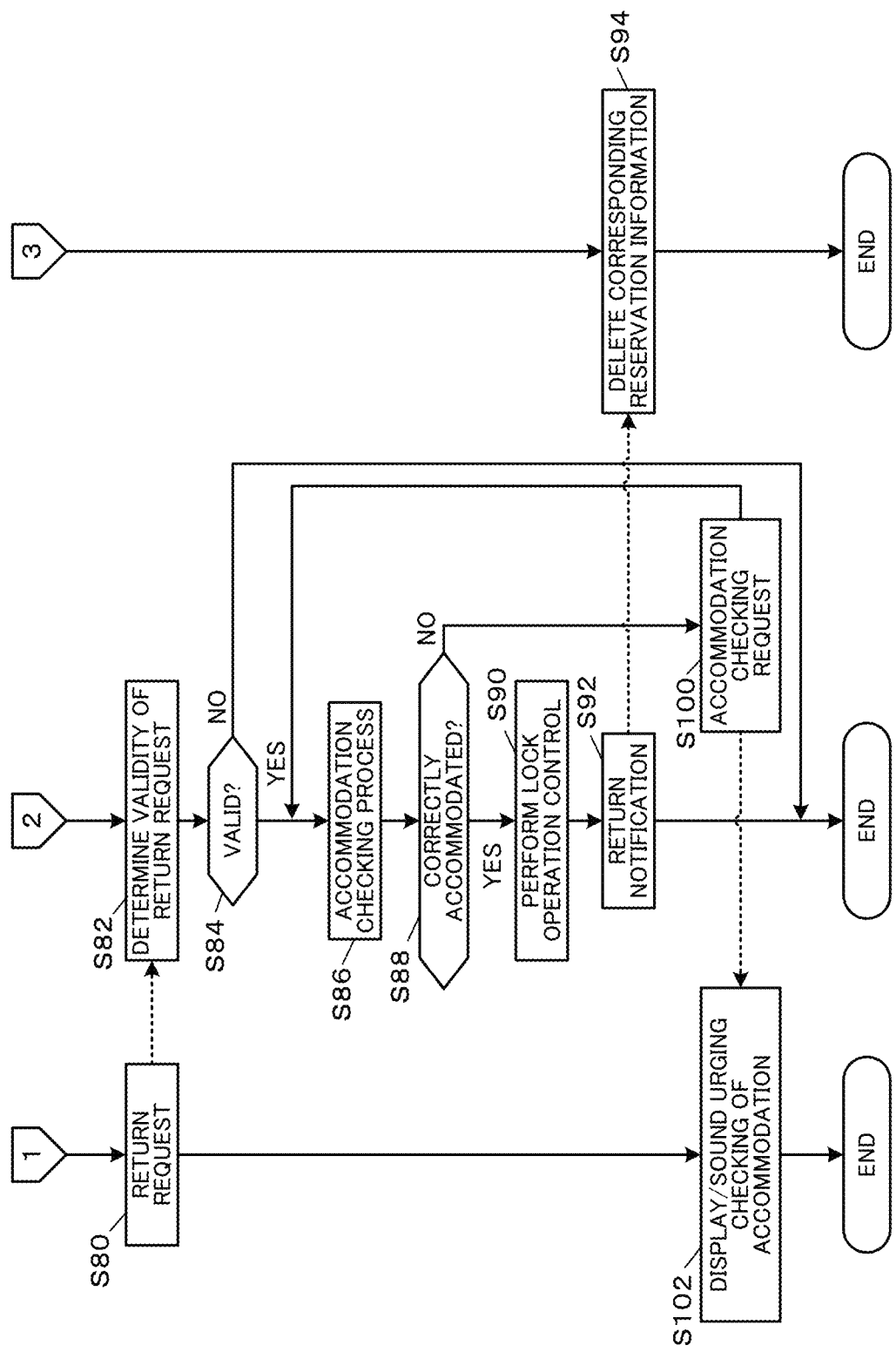
FIG. 13 is a flowchart continued from FIG. 12.

FIGS. 12 and 13 are flowcharts for describing operations of the server system 1100, the user terminal 1500, and the vehicle-mounted device 10. The flowcharts illustrate a flow from registration of user information and setting of a reservation for a vehicle to be used, performed by a user, to return of the reserved vehicle after use.

As illustrated in FIG. 12, when a user inputs a predetermined registration request operation to the user terminal 1500, the user terminal 1500 connects to the server system 1100 over the network 9 and transmits a user registration request (step S10). In response, the server system 1100 performs a predetermined user registration procedure process (step S12). In the user registration procedure, a user account is assigned, and also, a predetermined registration screen is displayed on the user terminal 1500 and the user is asked to input information that is necessary for user registration, such as personal information (such as name, address, age, sex, and driver's license number) and contact information (such as telephone number and email address), for example. The user terminal 1500 transmits a result of input to the registration screen, to the server system 1100. The server system 1100 creates and stores new user registration information 600 based on the result of input to the registration screen.

When the user inputs a predetermined reservation setting operation to the user terminal 1500, the user terminal 1500 connects to the server system 1100 over the network 9 and transmits a reservation setting request (step S20). In response, the server system 1100 performs a predetermined reservation procedure process (step S22). In the reservation procedure process, a predetermined reservation setting screen (including a selection screen for the vehicle 5 as the sharing target, an input screen for the reservation period and the like, for example) is displayed on the user terminal 1500, and the user is asked to input information that is necessary for reservation setting. The user terminal 1500 transmits a result of input to the reservation setting screen, to the server system 1100.

The server system 1100 creates and stores new reservation information 700 (including a unique reservation ID, a reserving user account, a reserved sharing target ID, a reservation period, a unique password and the like, for example) based on the result of input to the reservation setting screen (step S24), and provides a copy thereof to the user terminal 1500 as duplicate information regarding the reservation (step S26). The user terminal 1500 stores the same as the reservation information 700*t* (step S28).

Each vehicle-mounted device 10 connects to the server system 1100 and transmits a reservation information provision request and the device ID 504 when a predetermined timing is reached (step S40). The server system 1100 searches for the reservation information 700 associated with the device ID 504, based on the reservation information provision request and the device ID 504 transmitted from the vehicle-mounted device 10 (step S42), and returns/provides a copy of associated reservation information 700 that is not yet fulfilled (step S44). The vehicle-mounted device 10 receives and stores the same as the reservation information 700*c* (step S46).

The user who made the reservation goes to the location of the vehicle 5 with the user terminal 1500 in time for the start of the reservation period, and inputs a predetermined unlock operation. The user terminal 1500 communicatively connects to the vehicle-mounted device 10 in the vehicle according to the unlock operation, and transmits the unlock request and the reservation information 700*t* (step S60).

In response, the vehicle-mounted device 10 performs a validity determination process regarding the unlock request (step S62). In the validity determination process, first determination of checking the reservation information 700*t* that is received together with the unlock request against the reservation information 700*c* that is stored in the subject device, and second determination of checking whether the current date/time is within the reservation period that is set in the reservation information 700*c* are performed. In the case where positive determination is made in both the first determination and the second determination, the unlock request is determined to be valid. In the case where the unlock request is valid (YES in step S64), the vehicle-mounted device 10 performs an unlock operation control process and causes the first actuator 31 to perform the button pressing operation (step S66).

Figure 14:
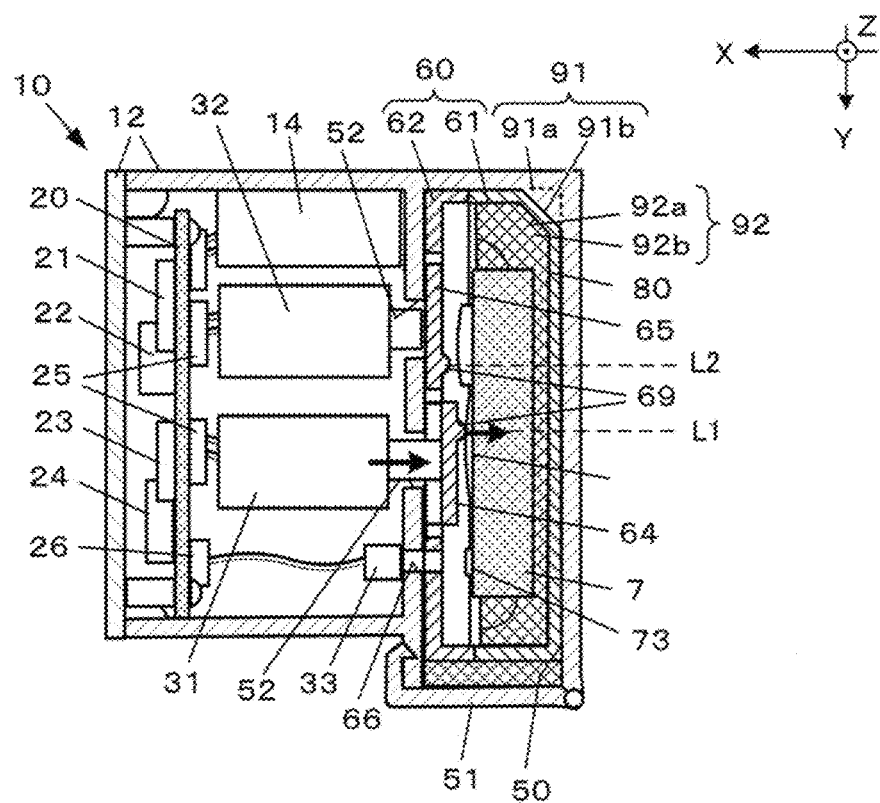
FIG. 14 is a cross-sectional view illustrating a state where the first actuator is operated.

As illustrated in FIG. 14, when the first actuator 31 operates, the movable portion of the first actuator 31 moves toward the accommodation unit 50 (in the X-axis negative direction), contacts the first intended button pressing position 67 (see FIG. 3) of the first swing piece 64, and further presses the first swing piece 64 in the X-axis negative direction. The protruding portion 69 of the first swing piece 64 presses the unlock button 71 of the electronic key 7 that is being held by the attachment 80 of the inner case 60. When the unlock button 71 is pressed, the electronic key 7 transmits the unlock signal in radio waves, and the vehicle 5 receives the same and performs the unlock operation.

When the vehicle 5 is unlocked, the user can get in the vehicle. If the user wishes, the user can open the open/close portion 51 of the vehicle-mounted device 10 (see FIG. 2), and take out, carry and use the inner case 60. In the case of taking out the inner case 60 where the electronic key 7 is fitted from the vehicle-mounted device 10 and using the same, the user can unlock the door of the vehicle 5 by pressing the swing end portion 64*a* (see FIG. 3) of the first swing piece 64 of the open/close cover 62 of the inner case 60 with a fingertip, and can lock the door of the vehicle 5 by pressing the swing end portion 65*a* (see FIG. 3) of the second swing piece 65 with a fingertip. That is, unlocking/locking can be performed without taking out the electronic key 7 from the inner case 60 and convenience is high.

Furthermore, if the user wishes, the user can open the open/close cover 62 (see FIG. 4) of the inner case 60, and take out the electronic key 7 and check the design and usability of the electronic key 7.

To return the electronic key 7, the open/close cover 62 of the inner case 60 is opened, and the electronic key 7 is fitted in the recessed holding portion 82 of the attachment 80 with the side where the unlock button 71 and the lock button 72 are arranged at the top. A recessed shape of the recessed holding portion 82 is molded such that the electronic key 7 is fitted with the side where the unlock button 71 and the lock button 72 are arranged at the top, and thus, the electronic key 7 may simply be fitted in the recessed holding portion 82 according to the shape.

Referring back to FIG. 12, when the user inputs a predetermined lock operation to the user terminal 1500, the user terminal 1500 communicatively connects to the vehicle-mounted device 10, and transmits the lock request and the reservation information 700*t* (step S70).

The vehicle-mounted device 10 performs a validity determination process regarding the lock request according to the lock request and the reservation information 700*t* transmitted from the user terminal 1500 (step S72). In the validity determination process, first determination of checking the reservation information 700*t* that is received together with the lock request against the reservation information 700*c* that is stored in the subject device, and second determination of checking whether the current date/time is within or after the reservation period that is set in the reservation information 700*c* are performed. In the case where positive determination is made in both the first determination and the second determination, the lock request is determined to be valid. In the case where the lock request is valid (YES in step S74), the vehicle-mounted device 10 performs a lock operation control process and causes the second actuator 32 to perform the button pressing operation (step S76).

Figure 15:
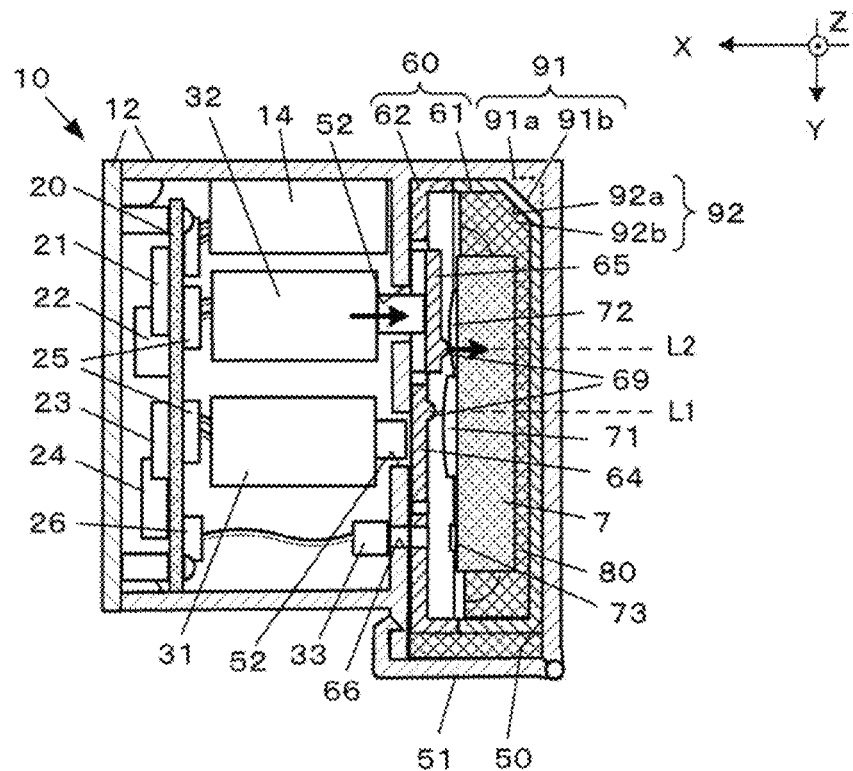
FIG. 15 is a cross-sectional view illustrating a state where the second actuator is operated.

As illustrated in FIG. 15, when the second actuator 32 operates, the movable portion of the second actuator 32 moves toward the accommodation unit 50 (in the X-axis negative direction), contacts the second intended button pressing position 68 (see FIG. 3) of the second swing piece 65, and further presses the second swing piece 65 in the X-axis negative direction. The protruding portion 69 of the second swing piece 65 presses the lock button 72 of the electronic key 7 that is being held by the attachment 80 of the inner case 60. When the lock button 72 is pressed, the electronic key 7 transmits the lock signal in radio waves, and the vehicle 5 receives the same and performs the lock operation.

Referring now to FIG. 13, in the case of returning the vehicle 5 that is currently reserved after using the same, the user inputs a predetermined return operation to the user terminal 1500. When the return operation is input, the user terminal 1500 communicatively connects to the vehicle-mounted device 10, and transmits the return request and the reservation information 700*t* (step S80).

The vehicle-mounted device 10 performs a validity determination process regarding the return request according to the return request and the reservation information 700*t* transmitted from the user terminal 1500 (step S82). In the validity determination process, first determination of checking the reservation information 700*t* that is received together with the return request against the reservation information 700*c* that is stored in the subject device, and second determination of checking whether the current date/time is within or after the reservation period that is set in the reservation information 700*c* are performed. In the case where positive determination is made in both the first determination and the second determination, the return request is determined to be valid.

In the case where the return request is valid (YES in step S84), the vehicle-mounted device 10 performs an accommodation checking process regarding the electronic key 7 (step S86). Specifically, in the case where the marker sticker 73 is captured by the accommodation sensor 33 at a correct orientation, the electronic key 7 is determined to be correctly accommodated.

In the case where the electronic key 7 is correctly accommodated (YES in step S88), the vehicle-mounted device 10 performs lock operation control (step S90), connects to the server system 1100, and transmits the predetermined return notification and the reservation ID in the reservation information 700*c* used for validity determination (step S92). The server system 1100 deletes the reservation information 700 with the reservation ID according to the return notification and the reservation ID transmitted from the vehicle-mounted device 10 (step S94).

In the case where the electronic key 7 is not correctly accommodated, or more specifically, in the case where the electronic key 7 is not returned to the inner case 60 or the direction of fitting in the attachment 80 is wrong (NO in step S88), the vehicle-mounted device 10 transmits the predetermined accommodation checking request to the user terminal 1500 (step S100). In response to the accommodation checking request transmitted from the vehicle-mounted device 10, the user terminal 1500 displays a screen urging to fit the electronic key 7 in the attachment 80 at a correct orientation and emits a sound urging attention for a predetermined period of time (step S102).

Other Embodiments

An embodiment has been described above, but the mode of the present disclosure is not limited to the mode described above, and structural elements may be added, removed or changed as appropriate.

Case 1.

Figure 16:
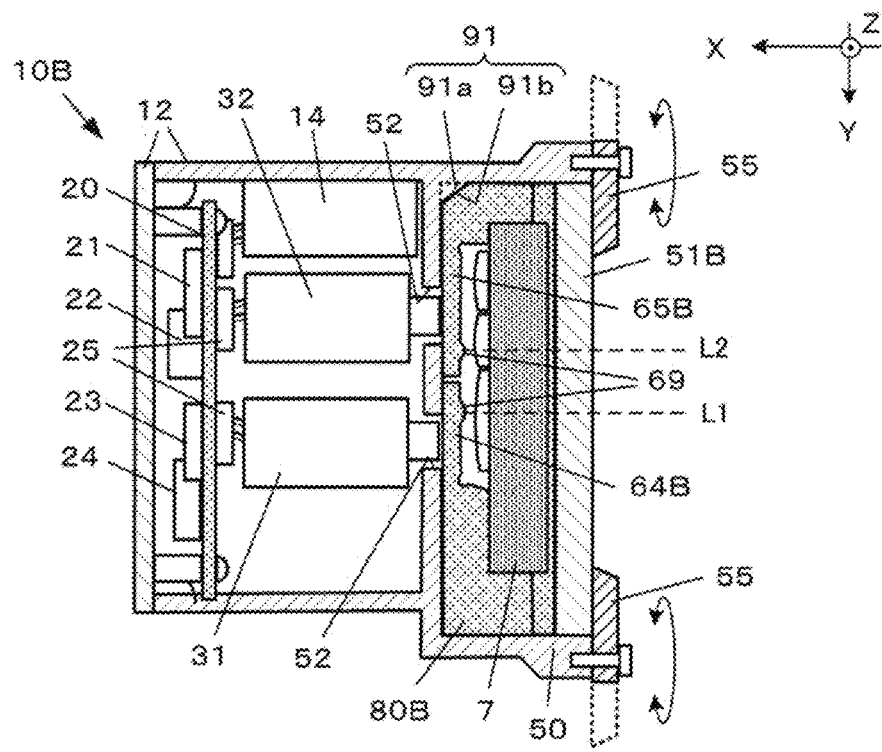
FIG. 16 is a diagram illustrating a modification of the vehicle-mounted device (Case 1).

For example, elements related to the inner case 60 and the accommodation sensor 33 may be removed from the embodiment described above. Specifically, a vehicle-mounted device 10B illustrated in FIG. 16 is an example where the two are removed. With the vehicle-mounted device 10B, an open/close portion 51B is formed as a back cover that can be attached/removed from a rear side of the accommodation unit 50 by removing thumb turns 55, and an attachment 80B is a member that covers a front side of the electronic key 7. The electronic key 7 is fitted with the front side facing a forward side of a space in the accommodation unit 50, by removing the open/close portion 51B.

As parts corresponding to the first swing piece 64 and the second swing piece 65 of the embodiment described above, the attachment 80B includes a first elastic portion 64B at an intended button pressing position of the first actuator 31, and a second elastic portion 65B at an intended button pressing position of the second actuator 32.

Also with the structure of the attachment 80B described above, similar effects as those in the embodiment described above may be achieved by preparing the attachment 80B for each type of electronic key 7.

Case 2.

Figure 17:
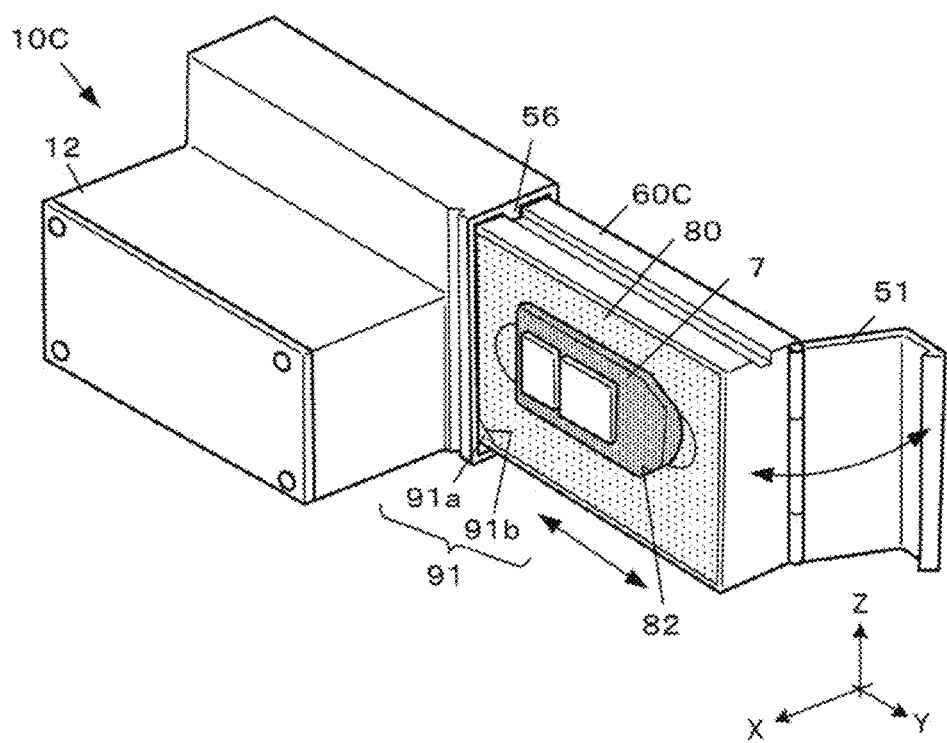
FIG. 17 is a diagram illustrating a modification of the vehicle-mounted device (Case 2).

As in the case of a vehicle-mounted device 10C illustrated in FIG. 17, a structure where an inner case 60C is to be pulled out from the accommodation unit 50 is also possible. Specifically, the vehicle-mounted device 10C includes the attachment 80 similar to that of the vehicle-mounted device 10B. The inner case 60C for storing the attachment 80 does not include the open/close cover 62 but is open on a front side (a side in the X-axis positive direction), and can be pulled out along a guide rail 56 that is formed inside the accommodation unit 50. Such a structure can also achieve effects similar to those in the embodiment described above.

In the case of the vehicle-mounted device 10C, the inner case 60C cannot be removed from the vehicle-mounted device 10C. Accordingly, the user pulls out the inner case 60C and remove only the electronic key 7 from the attachment 80 to use the electronic key 7. By removing and directly operating the electronic key 7, buttons on the electronic key 7 other than the unlock button 71 and the lock button 72 (such as an open/close button for an electronic slide door) may be operated.

Case 3.

Figure 18:
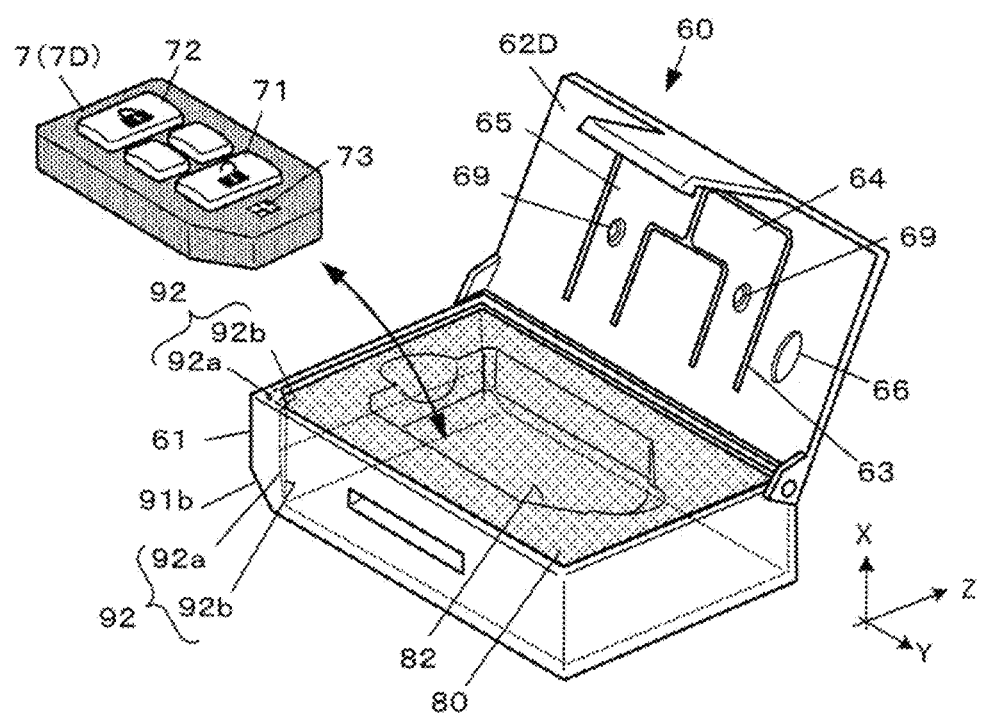
FIG. 18 is a diagram illustrating a modification of the vehicle-mounted device (Case 3).

The open/close cover 62 of the inner case 60 is not limited to the one type illustrated in FIGS. 3 and 4, and as illustrated in FIG. 18, one or more types of optional open/close covers 62D having the first swing piece 64 and the second swing piece 65 formed at different positions or the protruding portions 69 formed at different positions may be prepared to be exchanged with the original open/close cover 62 as appropriate.

Case 4.

The vehicle-mounted device 10 acquires the reservation information 700 from the server system 1100 at a predetermined timing (such as at periodic timings), but such a configuration may be changed. For example, at a time of receiving a certain request from the user terminal 1500 and performing validity determination, the vehicle-mounted device 10 may communicatively connect to the server system 1100 and may request, in response to the reception of the afore-mentioned request, the server system 1100 to check the reservation information 700t provided by the user terminal 1500 and the reservation information 700 stored in the server system 1100, and may determine that the request is valid in the case of match.

Case 5.

The embodiment described above describes an example configuration where the control board 20, the first actuator 31 and the second actuator 32 are embedded in the same outer case 12, but such an example is not restrictive. For example, mechanical units such as the first actuator 31, the second actuator 32, and the accommodation unit 50, and a control unit such as the control board 20 may be embedded in different cases while being connected in a manner capable of wireless communication or wired communication, and operation of the mechanical units may be controlled by the control unit.

Case 6.

The accommodation sensor 33 may be removed as appropriate. For example, the accommodation sensor 33 does not have to be included in the case where the first erroneous-assembly prevention structure 91 and the second erroneous-assembly prevention structure 92 are included and the holding orientation guide 84 cannot hold the electronic key 7 at other than a correct orientation (such as in a case where the open/close cover 62 of the inner case 60 cannot be closed due to the electronic key 7 not being fitted or due to the electronic key 7 being raised, for example).

Case 7.

The embodiment described above describes a configuration where the attachment 80 and the inner case 60 are separate parts and where the attachment 80 is attachable to and removable from the inner case 60, but such a case is not restrictive. For example, a configuration is also possible where the attachment 80 is integrated with the inner case 60 (such as a case where the two are made of the same material and are integrally molded, or where the two are separately created and then bonded together). In this case, the inner case 60 including the attachment 80 is exchanged as it is depending on the type of the electronic key 7.

Overview

An overview of the disclosure of the present specification is as follows.

A mode of the present disclosure is a vehicle-mounted device including: an accommodation unit that accommodates an electronic key of a vehicle; and an actuator that performs a button pressing operation on the electronic key that is accommodated in the accommodation unit, where the accommodation unit allows the actuator to perform the button pressing operation on push buttons on different electronic keys of different vehicles.

According to such a mode, the electronic key is used by being accommodated in the vehicle-mounted device as it is without being disassembled. The task of disassembling the electronic key, taking out an internal circuit and assembling the internal circuit with the vehicle-mounted device is not necessary.

The accommodation unit may accommodate a holding unit for holding the electronic key, and the holding unit may be exchangeable according to the different electronic keys.

Exchangeable holding units may be formed such that intended button pressing positions at which the actuator presses the push buttons on the different electronic keys come at a relatively same position.

The electronic key may be attachable to and removable from the holding unit.

The holding unit may include an attachment for holding the electronic key and a case for storing the attachment, and the case may store the attachment in an exchangeable manner so that the intended button pressing positions on the push buttons on the different electronic keys come at a same position.

The case may include a swing piece including a protruding portion at a position corresponding to the intended button pressing positions, and the actuator may perform an operation of pressing the swing piece as the button pressing operation.

The attachment may include an elastic portion at a position corresponding to the intended button pressing position, and the actuator may perform an operation of pressing the elastic portion as the button pressing operation.

There may be further included an information acquisition control unit that acquires certain information from outside; and an operation control unit that causes the actuator to perform the button pressing operation, in a case where the certain information is acquired by the information acquisition control unit.

The electronic key may include a predetermined marker, and the vehicle-mounted device may further include a marker detection unit that detects the predetermined marker on the electronic key that is accommodated in the accommodation unit.

The electronic key may be a genuine key of the vehicle.

A vehicle-mounted device may include: an accommodation unit that accommodates an electronic key of a vehicle; an actuator that performs a button pressing operation on the electronic key that is accommodated in the accommodation unit, and a swing piece that is arranged between the actuator and the electronic key, where a push button on the electronic key is pressed when the swing piece swings in response to the button pressing operation by the actuator.

EXPLANATION OF REFERENCES 5 vehicle
7 electronic key
10 vehicle-mounted device
20 control board
31 first actuator
32 second actuator
33 accommodation sensor
50 accommodation unit
51 open/close portion
60 inner case
62 open/close cover
64 first swing piece
65 second swing piece
67 first intended button pressing position
68 second intended button pressing position
69 protruding portion
71 unlock button
72 lock button
73 marker sticker
80 attachment
82 recessed holding portion
84 holding orientation guide
91 first erroneous-assembly prevention structure
92 second erroneous-assembly prevention structure
110 accommodation detection unit
131 first operation unit
132 second operation unit
200 processing unit
220 information acquisition control unit
222 operation control unit
600 user registration information
700 reservation information

The invention claimed is:

1. A vehicle-mounted device comprising:
an accommodator capable of accommodating any of a plurality of electronic keys of a vehicle, the plurality of electronic keys having different sizes and different thicknesses, and the accommodator accommodating one of the plurality of electronic keys;
an actuator that performs a button pressing operation on an electronic key that is accommodated in the accommodator;
a movable portion configured to move by the button pressing operation of the actuator; and
a swing portion supported at one side thereof and to which a pressing force by the button pressing operation of the actuator is to be applied by the movable portion contacting with the swing portion, wherein
the accommodator allows the swing portion to which the pressing force is applied to perform a pressing operation for pressing a push button on the electronic key, if any of the plurality of electronic keys is accommodated in the accommodator, and
the movable portion is configured to move linearly with respect to the swing portion.

2. The vehicle-mounted device according to claim 1, wherein
the accommodator accommodates a holder for holding the electronic key, and
the holder is exchangeable with one of a plurality of exchangeable holders according to the electronic key.

3. The vehicle-mounted device according to claim 2, wherein the exchangeable holders are formed such that intended button pressing positions at which the actuator presses the push button on the electronic key come at a relatively same position.

4. The vehicle-mounted device according to claim 3, wherein
the holder includes an attachment among a plurality of exchangeable attachments for holding the electronic key, and
each of the plurality of attachments is configured so that the intended button pressing positions come at a relatively same position.

5. The vehicle-mounted device according to claim 4, wherein
the attachment includes an elastic portion at a position corresponding to the intended button pressing position, and
the actuator performs an operation of pressing the elastic portion as the button pressing operation.

6. The vehicle-mounted device according to claim 4, wherein
each of the plurality of exchangeable holders includes an inner case configured to be accommodated in the accommodator,
each of the inner cases, which are exchangeable, is configured so that the intended button pressing positions come at a relatively same position, and
the inner case is configured to store the attachment in an exchangeable manner.

7. The vehicle-mounted device according to claim 3, wherein
each of the plurality of exchangeable holders includes an inner case configured to be accommodated in the accommodator, and
each of the inner cases which are exchangeable is configured so that the intended button pressing positions come at a relatively same position.

8. The vehicle-mounted device according to claim 2, wherein the electronic key is attachable to and removable from the holder.

9. The vehicle-mounted device according to claim 1, wherein
the swing portion includes a protruding portion protruding toward the electronic key at a position where the push button of the electronic key accommodated in the accommodator is pushed.

10. The vehicle-mounted device according to claim 1, further comprising:
an information acquisition controller that acquires certain information from outside; and
an operation controller that causes the actuator to perform the button pressing operation, in a case where the certain information is acquired by the information acquisition controller.

11. The vehicle-mounted device according to claim 1, wherein the electronic key is a genuine key of the vehicle.

12. A vehicle-mounted device comprising:
an accommodator capable of accommodating any of a plurality of electronic keys of a vehicle, the plurality of electronic keys having different sizes and different thicknesses, and the accommodator accommodating one of the plurality of electronic keys;
an actuator that performs a button pressing operation on an electronic key that is accommodated in the accommodator; and
a detection part configured to detect whether the electronic key is accommodated in the accommodator at a predetermined orientation, the accommodator allowing the button pressing operation by the actuator to be performed, wherein
the accommodator allows the actuator to perform the button pressing operation on a push button on the electronic key, if any of the plurality of electronic keys is accommodated in the accommodator, and
the detection part is configured to detect whether the electronic key is accommodated in the accommodator at the predetermined orientation, if any of the plurality of electronic keys is accommodated in the accommodator.

13. The vehicle-mounted device according to claim 12, wherein
the electronic key includes a predetermined marker, and
the detection part is configured to detect the predetermined marker on the electronic key that is accommodated in the accommodator.

14. A vehicle-mounted device comprising:
an accommodator capable of accommodating any of a plurality of electronic keys of a vehicle, the plurality of electronic keys having different sizes and different thicknesses, and the accommodator accommodating one of the plurality of electronic keys;
an actuator that performs a button pressing operation on an electronic key that is accommodated in the accommodator; and
a swing portion that is arranged between the actuator and the electronic key accommodated in the accommodator and to which a pressing force by the button pressing operation of the actuator is to be applied, wherein
the accommodator allows the actuator to perform the button pressing operation on a push button on the electronic key if any of the plurality of electronic keys is accommodated in the accommodator, and
a portion of the swing portion to which the pressing force is to be applied is wider than a swing support point of the swing portion in a direction orthogonal to an extension direction of the swing portion.

* * * * *